United States Patent
Hisada et al.

(10) Patent No.: US 8,113,663 B2
(45) Date of Patent: Feb. 14, 2012

(54) PROJECTION IMAGE DISPLAY APPARATUS AND PROJECTION OPTICAL UNIT TO BE USED THEREIN

(75) Inventors: Takanori Hisada, Yokohama (JP); Masahiko Yatsu, Fujisawa (JP); Koji Hirata, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 254 days.

(21) Appl. No.: 12/475,656

(22) Filed: Jun. 1, 2009

(65) Prior Publication Data
US 2009/0237621 A1 Sep. 24, 2009

Related U.S. Application Data

(62) Division of application No. 11/200,353, filed on Aug. 8, 2005, now Pat. No. 7,553,031.

(30) Foreign Application Priority Data

Nov. 1, 2004 (JP) .................................. 2004-317623
Apr. 21, 2005 (JP) .................................. 2005-123080

(51) Int. Cl.
*G03B 21/28* (2006.01)
*G02B 5/10* (2006.01)
(52) U.S. Cl. ............... 353/70; 353/50; 353/77; 353/98; 359/727
(58) Field of Classification Search ............ 353/50, 353/51, 69, 70, 77, 78, 98; 359/727–729
See application file for complete search history.

(56) References Cited

U.S. PATENT DOCUMENTS

| 6,951,395 B2 | 10/2005 | Chatani et al. |
| 2003/0206353 A1 | 11/2003 | Ishihara |
| 2006/0227299 A1* | 10/2006 | Hisada et al. ............... 353/77 |

FOREIGN PATENT DOCUMENTS

| JP | 5-134213 | 5/1993 |
| JP | 2000-162544 | 6/2000 |
| JP | 2002-357768 | 12/2002 |
| JP | 2003-161885 | 6/2003 |
| JP | 2003-287682 | 10/2003 |

* cited by examiner

*Primary Examiner* — Kevin Pyo
(74) *Attorney, Agent, or Firm* — Kilpatrick Townsend & Stockton LLP

(57) ABSTRACT

In a projection type image display apparatus, for enlarging an image on a image display apparatus 1 by means of a projection lens 2, thereby projecting the enlarged image onto a screen 6, obliquely, being inclined thereto, between the projection lens 2 and a rear-surface mirror 5, there are disposed free shaped surface mirrors 3 and 4, each having a free shaped surface for compensating a trapezoidal distortion due to oblique projection of the enlarged image. The surface configuration of the free shaped surface mirror is so shaped as to satisfy a following equation:

$$|L1-L2|>1.4 \cdot Dv$$

if assuming that a distance for a light beam of an upper end of the enlarged image to reach the screen after being reflected upon a free shaped surface is "L1", a distance for a light beam of a lower end of the enlarged image to reach the screen after being reflected upon the free shaped surface is "L2", and a distance from an upper end of an image on the screen to a lower end thereof is "Dv".

13 Claims, 11 Drawing Sheets

PROJECTION IMAGE DISPLAY APPARATUS AND PROJECTION OPTICAL UNIT TO BE USED THEREIN

BACKGROUND OF THE INVENTION

1. Field of the Invention

The present invention relates to a projection image display apparatus for performing an image display through projecting an enlarged image of color onto a screen, for example. And, in particular, the present invention relates to a projection image display apparatus for obtaining the enlarged image on the screen by projecting it obliquely onto the screen, and also a projection optical unit to be used therein.

2. Description of the Related Art

For so-called a projection-type color image display apparatus, for projecting a color picture on an image display element, such as, a projection-type cathode ray tube (CRT) or a liquid crystal display apparatus (i.e., a liquid crystal panel), etc., for example, enlargedly, on a screen through a projection optical system, requirement is made on reduction in the size, in particular, the depth of the apparatus, as well as, obtaining an enlarged image of sufficient large sizes on the screen. For achieving such the requirement, conventionally, as is described in Japanese patent Laying-Open No. Hei 5-134213 (1993) <Patent Document 1>, Japanese patent Laying-Open No. 2000-162344 (2000) <Patent Document2> and Japanese patent Laying-Open No. 2002-357768 (2002) <Patent Document 3>, for example, there is already known a technology of enlarging and projecting the image onto the screen from a direction oblique or inclined thereto (by a predetermined angle with respect to a normal line on the screen).

BRIEF SUMMARY OF THE INVENTION

By the way, when projecting a picture or an image on the image display apparatus on the screen from the direction oblique or inclined thereto, so-called a trapezoidal distortion is produced on the image projected on the screen. For dissolving this, the projection optical unit descried in the above-mentioned Patent Document 1 has such the structure, that an afocal converter disposed on a side of the screen is made eccentric, thereby to suppress the said trapezoidal distortion. However, since the afocal converter has a low magnifying power, therefore it is difficult to widen an angle of the projection image, and for that reason, there is a problem that thin-sizing of the apparatus cannot be achieved.

Also, with the projection optical unit described in the Patent Document 2 mentioned above, from the structure thereof, it is also difficult to obtain widening of the projection image. Therefore, there is still a problem that sufficient thin-sizing cannot be obtained even if applying that described in the Patent Document 2 into the rear-surface projection type color image display apparatus. Furthermore, with the projection optical unit described in the Patent Document 2, it has also other problem that the production thereof is difficult, since the lenses to be used therein must be made eccentric, separately.

Moreover, the projection optical unit described in the Patent Document 3 mentioned above has a first refraction lens system having a positive power and a second refraction lens system having a negative power, and also a return mirror for turning or folding back the optical path. Within such the structure, at least two (2) pieces of lenses among the lenses building up the second refraction lens system having the negative power are made to be eccentric systems, which are different from each other in the rotation symmetric axes thereof. For this reason, when producing thereof, it is difficult to maintain accuracy of positioning the respective lenses, sufficiently; therefore, there is a problem that the production thereof is also difficult.

As was mentioned above, for the purpose of reducing the depth thereof, in particular, in the projection optical unit of building up the image display apparatus, the so-called oblique projection may be indispensable. And, for obtaining further reduction of the depth, it is necessary to increase or enlarge an angle of that oblique projection.

However, when enlarging the angle of the oblique projection, also the trapezoidal distortion mentioned above is further enlarged. For this reason, an amount of eccentricity for compensating that trapezoidal distortion must be increased much more. Because of this, it is much difficult to produce an optical unit of satisfying such the requirement. Also, in relation to this, it is also necessary to enlarge a lens diameter as is needed. Thus, with the optical system in relation to the conventional art mentioned above, it is difficult to reduce the depth of the projection optical unit, and further the image display apparatus, much more.

According to the present invention, an object thereof is to provide a technology for enabling to reduce the distortion of the image on the screen, within an apparatus of projecting the image onto the screen, obliquely or inclined thereto, and thereby obtaining superior characteristics thereof.

Also, according to the present invention, an object thereof is to provide a technology for enabling to reduce the depth size of the apparatus, and to reduce the distortion of the image on the screen, as well.

For accomplishing the objects mentioned above, according to the present invention, there is provided a projection-type image display apparatus, comprising: a first optical system, including an image display element, a screen, and plural numbers of lenses, for projecting a display image on said image display element, enlargedly; and a second optical system for projecting an enlarged image from said first optical system, at a predetermined angle to a normal line on said screen; wherein said second optical system includes an optical element therein, having a curved surface for reflecting the enlarged image from said first optical system, so as to guide onto said screen, and a portion of said optical element, for reflecting a light at a first optical distance, is curved to direct a concave into a reflection direction thereon, while a portion of said optical element, for reflecting a light at a second optical distance shorter than said first optical distance, is curved to direct a convex into a reflection direction thereon, if assuming that an optical path length of the light incident upon said screen is the optical distances.

And, according to the present invention, within the projection-type image display apparatus, as is described in the above, preferably, said optical element is a curved surface reflection mirror, a reflection surface of which is formed into a free shaped surface configuration, and said second optical system makes projection from a portion lower than said screen at a predetermined angle with respect to the normal line on said screen, and said curved surface reflection mirror is so curved, as to direct a concave into the reflection direction thereon in a portion thereof, for reflecting the light of an upper image above a center on said image display element, and to direct a convex into the reflection direction thereon in a portion thereof, for reflecting the light of a lower image below the center on said image display element. Also, according to the present invention, it is preferable that the projection-type image display apparatus, described in the above, further comprises a plane-like rear-surface mirror for reflecting the enlarged image from said optical element, thereby to project it on a rear-surface side of said screen. Further, it is also preferable, said optical element is disposed below said rear-surface mirror. Further, according to the present invention, within the projection-type image display apparatus as is described in the above, it is preferable said optical element includes at least two (2) pieces of mirrors, each reflection surface of which is formed into the free shaped surface configuration.

Also, according to the present invention, also for accomplishing the objects mentioned above, there is also provided a projection-type image display apparatus, comprising: an image display element; a screen; a first optical system, including plural numbers of lenses therein, for projecting a display image on said image display element, enlargedly, and being a coaxial optical system, which is constructed with surfaces, an optical axis of each of which passes through at almost a center of said image display element and each having a symmetric configuration with respect to said optical axis; and a second optical system for projecting an enlarged image from said first optical system onto said screen, obliquely, being inclined thereto; wherein said second optical system includes an optical element having a free shaped surface, for compensating a trapezoidal distortion and/or an aberration, which is/are caused due to an oblique projection of said enlarged image.

According to the present invention, within the projection-type image display apparatus as is described in the above, the free shaped surface of said optical element includes at least one (1) pieces of a mirror surface. And, also within the projection-type image display apparatus as is described in the above, said optical element may include a curved surface reflection mirror, and within said curved surface reflection mirror, a portion for reflecting the light of an upper image above a center on said image display element is curved to direct a concave into the reflection direction thereon, thereby having a positive power, and a portion for reflecting the light of an upper image below the center on said image display element is curved to direct a convex into the reflection direction thereon, thereby having a negative power.

Further, according to the present invention, there is provided a projection optical unit to be used in a projection image display apparatus, comprising: a first optical system including plural numbers of lenses therein, for projecting a display image on an image display element, enlargedly, having an optical axis thereof being nearly equal to a central axis of said image display element; and a second optical system for projecting an enlarged image from said first optical system onto a screen, at a predetermined angle with respect to a normal line on said screen; wherein said second optical system includes an optical element having a reflection surface of forming a free shaped surface configuration, for reflecting the enlarged image from said first optical system, thereby to guide it onto said screen, and a portion of said optical element, for reflecting an image on said image display element above a center thereof, is curved to direct a concave into a reflection direction thereon, while a portion thereof said optical element, for reflecting the image on said image display element below the center thereof, is curved to direct a convex into a reflection direction thereon. And, according to the present invention, within the projection optical unit as described in the above, preferably, said optical element is a curved surface reflection mirror having a free shaped surface configuration, and said optical element includes at least two (2) pieces of said curved surface reflection mirrors.

And, according to the present invention, within the projection optical unit as described in the above, if assuming that a distance for a light beam of an upper end of said enlarged image to reach said screen after being reflected upon said reflection surface is "L1", the a distance for a light beam of a lower end of said enlarged image to reach said screen after being reflected upon said reflection surface is "L2", a distance from an upper end of an image on said screen to a lower end thereof is "Dv", and an angle defined by a light beam incident upon on said screen at a center thereof and a normal line on said screen is "θ", within a surface in a direction perpendicular to said screen, being in parallel with the normal line on said screen, then they are so constructed as to satisfy a following equation:

$$|L1-L2|<1.2 \cdot \sin \theta \cdot Dv$$

Also, according to the present invention, within the projection optical unit as described in the above, if assuming that a distance for a light beam of an upper end of said enlarged image to reach said screen after being reflected upon said reflection surface is "L1", the a distance for a light beam of a lower end of said enlarged image to reach said screen after being reflected upon said reflection surface is "L2", and a distance from an upper end of an image on said screen to a lower end thereof is "Dv", within a surface in a direction perpendicular to said screen, being in parallel with the normal line on said screen, then those are so constructed as to satisfy a following equation:

$$|L1-L2|>1.4 \cdot Dv$$

Thus, according to the present invention, it is possible to made the optical depth of the apparatus small, as well as, reducing the trapezoidal distortion caused due to the oblique projection of the image.

BRIEF DESCRIPTION OF THE DRAWINGS

Those and other objects, features and advantages of the present invention will become more readily apparent from the following detailed description when taken in conjunction with the accompanying drawings wherein.

DETAILED DESCRIPTION OF THE PREFERRED EMBODIMENT

Hereinafter, embodiments according to the present invention will be fully explained by referring to the attached drawings. First of all, FIG. 1 attached herewith is the cross-section view of the projection image display apparatus according to an embodiment of the present invention, in particular, for showing the basic structure of a projection optical unit to be used in the image display apparatus of rear-projection type.

Figure 1:
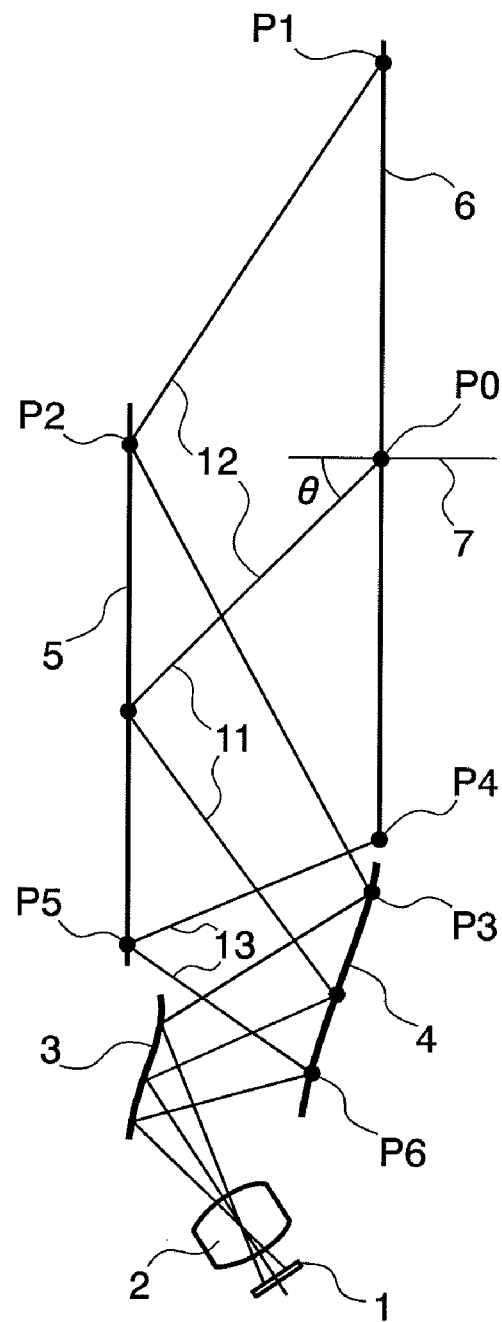
FIG. 1 is a cross-section view of a projection optical unit for showing the basic structure thereof, in particular, within a projection-type image display apparatus, according to an embodiment of the present invention.

In the basic structure of the projection optical unit shown in this FIG. 1, the light emitted from an image display element 1, which is disposed in a lower side of the figure, passes through a first optical system 2 (i.e., a projection lens), including plural numbers of refraction lenses therein, each of which has surface configurations being symmetric rotationally. Thereafter, it is reflected upon a surface of a reflection mirror 3 having a first free shaped surface configuration (hereinafter, called by "free shaped surface mirror"), and further is reflected upon a second free shaped surface mirror 4. That reflection light is reflected upon a rear-surface mirror 5 having a plane reflection surface of being a third optical system, and is incident upon a rear-surface of a screen 6. However, in the present embodiment, the optical system constructed with the first free shaped surface mirror 3 and the second free shaped surface mirror 4 will be called by a "second optical system".

Herein, the image display element 1 may be a one of self-light emission type, such as, a projection-type CRT, for example, or alternately, one of a transmission-type, such as, a liquid crystal panel, for example. However, in this figure, an irradiation means will be omitted from illustration thereof, such as, a lamp, etc., being necessary when the image display element 1 is constructed with the transmission-type, i.e., the liquid crystal panel, for example. Also, when applying the liquid crystal panel to be the image display element 1, for example, it may be of a type, of composing or synthesizing an image of plural numbers of colors with using three (3) pieces of the liquid crystal panels therein. However, in this figure, also a prism for use of composition, etc., being necessary in such case, will be omitted from illustration thereof. But, as is apparent from the figure, the image display element 1 is so disposed that the center of image screen or plane thereof lies on an optical axis of the first optical system (i.e., the projection lens) 2. Disposing the center of the image screen of the image display element 1 on the optical axis of the first optical system, in this manner, enables to achieve an optical system having small depth with using the oblique projection, but without enlarging the size of the lenses.

And, as is shown in FIG. 1, the light beam 11 emitting from the center of image screen of the image display element 1, passing through a center of an entrance pupil of the first optical system (i.e., the projection lens) 2, and thereafter being incident upon a center of an image of the screen 6, it enters into, obliquely, being inclined with respect to the screen. Herein, at a point P0 where the said light beam 11 enters into (or is incident) upon the screen, an angle defined between the normal line on the screen surface and that light beam is "θ", and it called by a "oblique (or inclined) incidence angle", hereinafter. Further, the cross-section shown in this FIG. 1 is for showing the cross-section of the projection optical unit mentioned above, being cut along the plane defined by the light beam 11 entering at the center of image on the screen 6 and the normal line on said screen. Thus, this cross-section is that cut into the vertical direction in parallel with normal line on the screen.

On the other hand, within the cross-section mentioned above, the light beam, exiting from a lower end of the image screen of the image display element 1, propagates along a straight line connecting between a lower end of the said screen and the centers of the entrance pupil of the first optical system (i.e., the projection lens) 2, and it enters into a position on the screen 6 corresponding thereto, i.e., point P1 locating on an upper end of image of the screen 6. It is assumed that, the length of an optical path, starting from a point P3 where that light beam 12 passes through (i.e., be reflected upon) the second free shaped surface mirror 4, via a point P2 on the rear-surface mirror 5, and reaching to the point P1 on the screen, is "L1". Also, a light beam 13, emitted from an upper end of image screen of the image display element 1, propagates along a straight line connecting between the upper end of the screen and the centers of the entrance pupil of the first optical system (i.e., the projection lens) 2, and it enters into a position on the screen 6 corresponding thereto, i.e., point P4 locating on a lower end of image of the screen 6. It is assumed that, the length of an optical path, starting from a point P6 where that light beam 13 passes through (i.e., be reflected upon) the second free shaped surface mirror 4, via a point P5 on the rear-surface mirror 5, and reaching to the point P6 on the screen, is "L2".

And, within the projection optical unit, according to the present embodiment, it is so constructed that the optical path lengths "L1" and "L2" (i.e., the difference of the optical path length) satisfy the following equation 1:

$$|L1-L2|<1.2 \cdot \sin \theta \cdot Dv \quad \text{(Eq. 1)}$$

However, "Dv" is a size of the image on the screen within the cross-section shown in FIG. 1. In other words, it is a distance from the point P1 on the upper end of image on the screen 6 up to the point P4 on the lower end of image thereof. Also, "θ" is the oblique incidence angle mentioned above. Further, within the projection optical unit, according to the present embodiment, it is so constructed that an absolute value |L1−L2| of the difference between the optical path lengths L1 and L2 is smaller than that in the case when the second free shaped surface mirror is made into a plane.

Following the above, explanation will be made in details thereof, about a reason of making the difference |L1−L2| in the optical path length satisfy the equation mentioned above, hereinafter.

However, for letting the light from the projection lens 2 building up the first optical system to be incident upon the screen 6, obliquely, while being inclined thereto, it is well known that it is turned back (i.e., be reflected) by means of the rear-surface mirror 5 mentioned above, and further with this, the image display apparatus of the rear-surface projection type can be made small in the size of depth thereof.

Figure 2:
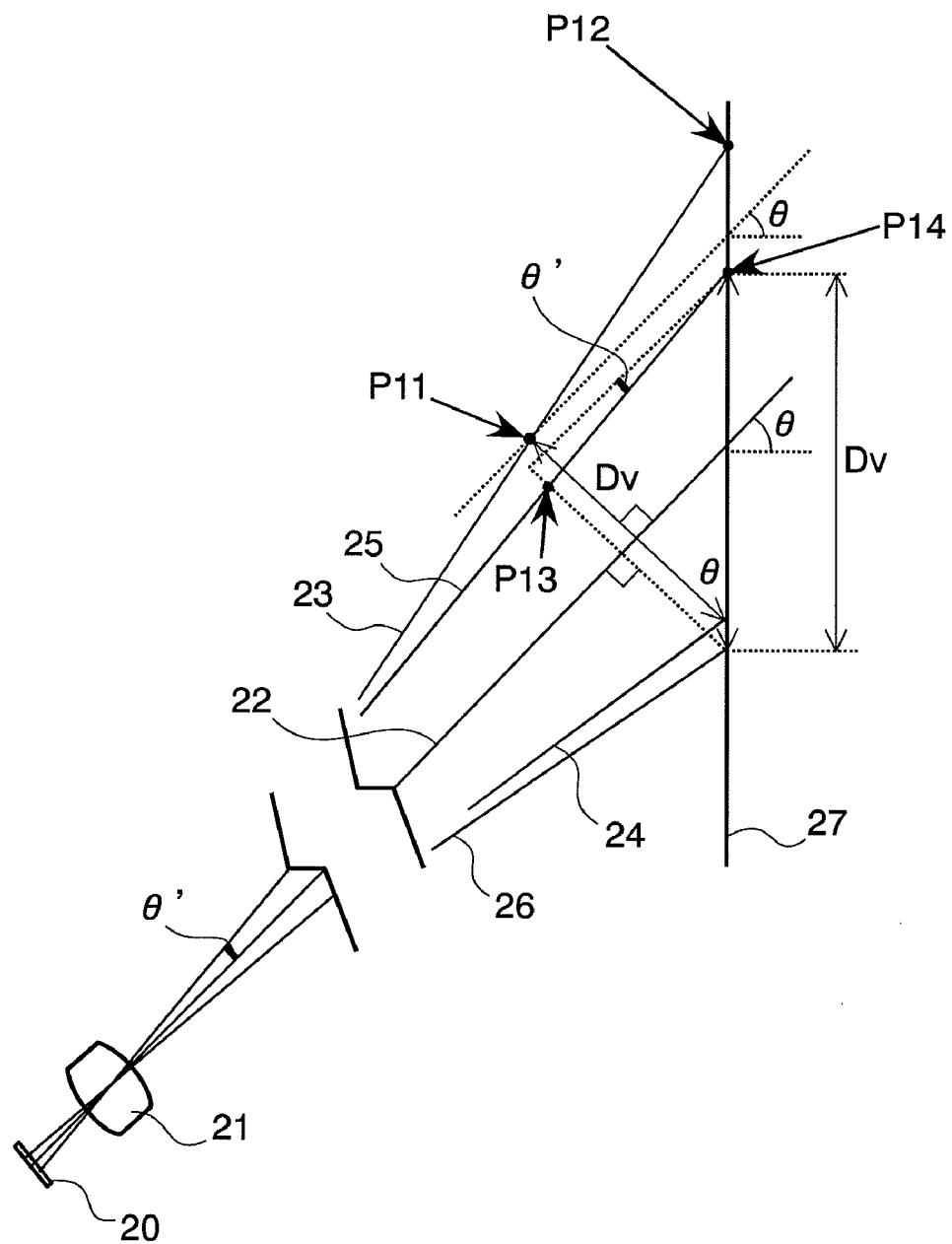
FIG. 2 is a partial enlarged view for showing a part thereof shown in FIG. 1, for explaining about an oblique projection onto a screen within the projection optical unit mentioned above.

Herein, a concept will be shown in FIG. 2, in case when letting the light beams 22, 23 and 24 to be incident upon, obliquely, while being inclined with respect to the screen 27 (corresponding to that shown by the reference numeral 2 in FIG. 1), by inclining the projection lens 21 of the coaxial optical system (corresponding to that shown by the reference numeral 2 in FIG. 1) with respect to the screen 27 (corresponding to that shown by the reference numeral 6 in FIG. 1). In this FIG. 2, when the light beam 22 emitting from the center of screen of the image display element (corresponding to that shown by the reference numeral 1 in FIG. 1), which is disposed on the optical axis of the projection optical system 21, along the optical axis thereof reaches onto the screen 27, the size of the image in the direction perpendicular to the light beam 22 can be expressed as below, in the vicinity of the said screen. Thus, the size of the image is the distance between an intersecting point P11 of a line perpendicular to the light beam 22 and the light beam 23 in the above thereof, and an intersecting point of a line perpendicular to the light beam 22 and the light beam 24 in the below thereof. And, the value thereof is "Dv", being the size of screen of the image display element 20 that is projected on the screen 27, inherently or originally, (i.e., the length in the vertical direction).

However, since the light beams from the image screen of the image display element 20 are incident upon, obliquely, therefore the light beam 23 in the above, emitting from the said image screen, actually, reaches up to the point P12 upon the screen 27. For this reason, the image on the screen comes to be larger than "Dv", and this is a reason of causing the distortion of a figure. At the same time, between the light beam 23 in the above emitting from the image screen and the light beam 24 in the blow, there is causes a difference in the optical path length, from the projection lens 21 up to the screen 27, in the similar manner. However, the value of the difference in the optical path length corresponds to the distance between the intersecting point P11 of a line perpendicular to the light beam 22 from the center of screen image and the light beam 23 from the upper of the screen image, and the intersecting point P12 of the light beam 23 and the screen 27, approximately.

Then, in the projection optical unit according to the present embodiment, the structure of which was explained by referring to FIG. 1, in the above, the free shaped surface mirrors (i.e., the first free shaped surface mirror 3 and the second free shaped surface mirror 4 in FIG. 1) are disposed just outside the projection lens 21 (corresponding to that shown by the reference numeral 2 in FIG. 1), as was mentioned above. Then, if considering that the figure distortion mentioned above can be compensated with this free shaped surface mirror, the position where the light beam 23 coming from the upper of screen image, for example, is moved from the point P12 mentioned above to a point shown by P14 in FIG. 2, on the screen 27. Also, the light beam 24 coming from the lower of the screen image moves in a manner shown by a reference numeral 26. Namely, with this, the size of the screen image of the image display element 20 projected on the screen 27 (i.e., the length in the vertical direction) is "Dv", being an inherent or original size thereof.

Figure 11:
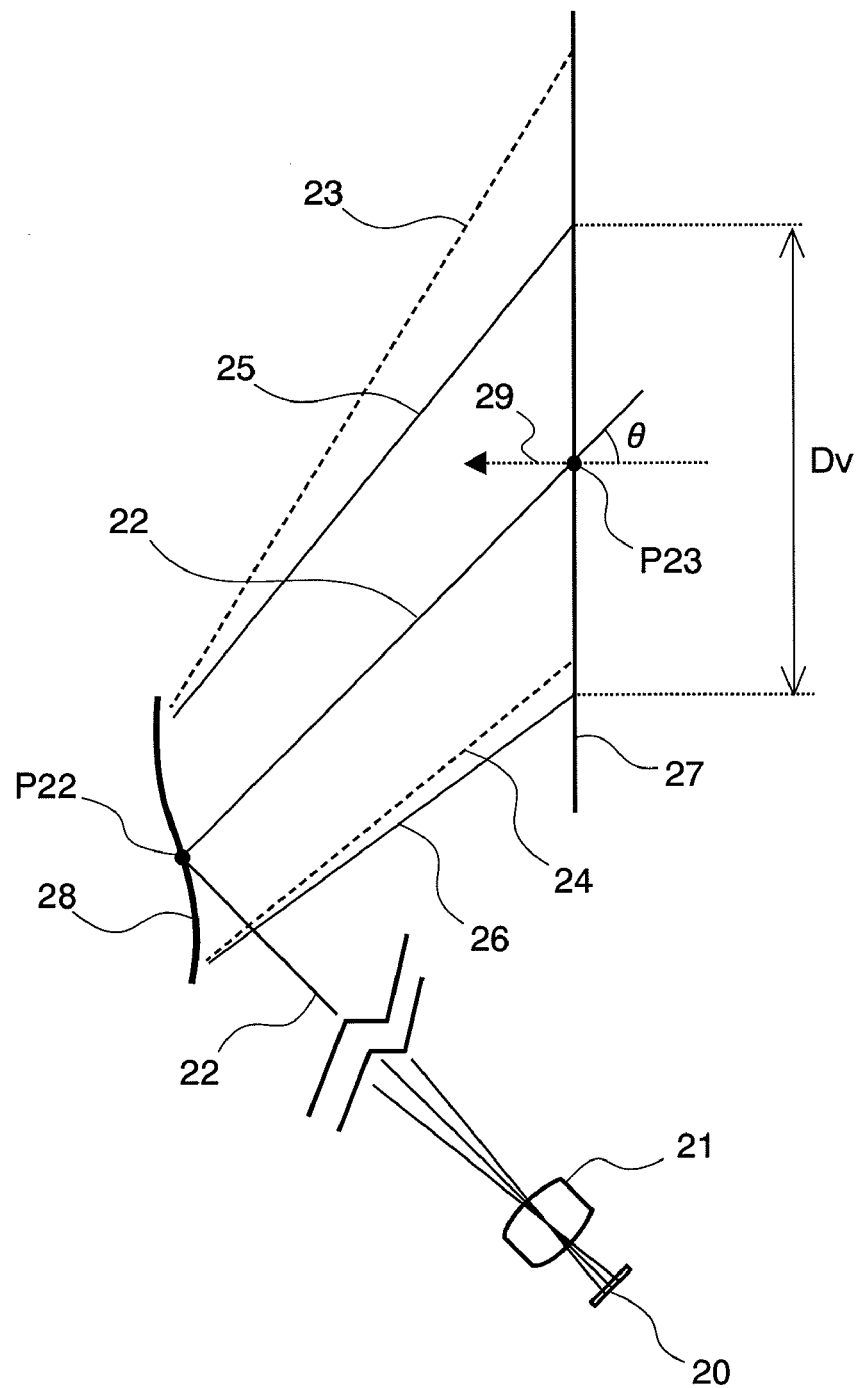
FIG. 11 is a view for showing the condition, conceptually, when conducing the oblique projection, while inclining an objection lens of a coaxial optical system with respect to the screen.

Herein, the condition where the light from the projection lens, being a rotationally symmetric optical system, is reflected upon the free shaped surface mirror, to be incident upon the screen, obliquely, while being inclined thereto, is shown in FIG. 11, conceptually. In FIG. 11, the image display element 20 is disposed on the optical axis of the projection optical system 21, and the light beam 22 emitting from the center of image plane of the image display element 20 along the optical axis of the projection optical system 20 (hereinafter, being called a "central light beam") is reflected upon the mirror 28, to be incident upon the screen 27, obliquely, at an angle "θ" thereto. In case where the mirror 28 is plane in the shape thereof, the image projected through the projection optical system 21 is projected, obliquely, on the screen 27, as it is. In this instance, a point where the light beam 23 directing to the upper end in FIG. 11, upon the image on the screen (shown by a broken line) is incident upon the screen and a point where the light beam 24 directing to the lower end (shown by a broken line) is incident upon the screen are in asymmetry with respect to a point P23 where the above-mentioned central light beam 22 is incident upon. For this reason, the trapezoidal distortion is generated in the image on the screen. In this instance, there is caused a large difference between the optical path length from the mirror 28 to the screen 27 along with the light beam 23 directing to the upper end of image on the screen and the optical path length from the mirror 28 to the screen 27, but along with the light beam 24 directing to the lower end of image on the screen.

Herein, when compensating the distortion while bringing the configuration of the mirror 28 into the free shaped surface, the light bean directing to the upper end in FIG. 11, upon the image on the screen moves downwards as is the light beam 25 shown in FIG. 11, the light beam direction towards further the lower end is as the light beam 26 shown in FIG. 11. Therefore, the point where the light beam 25 is incident upon the screen and the point where the light beam 26 is incident upon the screen are in symmetry with respect to the point P23 where the above-mentioned central light beam 22 is incident. Accordingly, the distance between the point where the light beam 25 is incident upon the screen and the point where the light beam 26 is incident upon the screen are nearly equal to the size "Dv" of a proper screen image; thereby, enabling to confirm that the distortion is compensated. In this instance, the difference between the optical path length from the mirror 28 to the screen 27 along the light beam 25 and the optical path length from the mirror 28 to the screen 27 but along the light beam 26 is smaller than that in the case of the light beams 23 and 24.

Namely, in the present embodiment, bringing the configuration of the mirror 28 into the free shaped surface configuration makes the difference small, between the optical path length from the mirror 28 to the screen 27 along the light beam directing to the upper end of image on the screen and the optical path length from the mirror 28 to the screen 27, but along the light beam directing to the lower end of image on the screen. As a result thereof, the distortion due to the oblique projection can be compensated, preferably.

Explanation will be given about an example of the free shaped surface configuration of the mirror 28, for compensating the distortion. Within the mirror 28, a portion for reflecting the light, which is longer than the central light beam 22 in the optical path length from the mirror 28 to the screen 27 with respect to the center of image on the screen (i.e., the light beam directing to the upper portion than the point P23 on the screen, in FIG. 11 (for example, the light beam 25)) is so curved that a concave is directed into a direction of reflection thereon. Thus, within a portion of the mirror 28 upper than the point P22, where the central light beam 22 is reflected thereupon, a reflection surface is made in a concave shape, so that it has a positive power therein. On the other hand, a portion for reflecting the light, which is shorter than the central light beam 22 in the optical path length from the mirror 28 to the screen 27 with respect to the center of image on the screen (i.e., the light beam directing to the lower portion than the point P23 on the screen, in FIG. 11 (for example, the light beam 26)) is so curved that a convex is directed into the direction of reflection thereon. Thus, within a portion of the mirror 28 lower than the point P22, where the central light beam 22 is reflected thereupon, a reflection surface is made in a convex shape, so that it has a negative power therein.

In brief, the free shaped surface mirror 28, according to the present embodiment, is so curved in a portion, for reflecting the light beam 25 having the first optical distance, that it directs the concave into the reflection direction, while it is so curved in other portion, for reflecting the light beam 26 having the second optical distance, that it directs the convex in the reflection direction. Since the image is projected, obliquely, from a lower part of the screen, in the present embodiment, the free shaped surface mirror 28 according to the present embodiment has a portion for reflecting the light of an image upper than the center of the image display element; i.e., the upper portion of the mirror 28, being curved so as to direct the concave into the direction of reflection thereon, it has the negative power.

Turning back to FIG. 2, when the distortion is compensated, the difference in the optical path length between the upper light beam 25 from the image screen and the lower light beam 26 from the image screen comes to be a size corresponding to the distance between the point P13 and the point P14 mentioned above. Thus, the size (i.e., the length in the vertical direction) of the image screen of the image display element, which is projected onto the screen 27, comes to be smaller than that before conducting the compensation upon figure distortion. In more details thereof, an adjustment is made upon the surface of the free shaped surface mirror so that the difference in the optical path length (i.e., the difference in the optical path from the projection lens 21 to the screen 27, which is generated between the upper light beam 23 and the lower light beam 24 emitted from the image screen of the image display element 20) corresponds to the distance between the point P13 and the point P14, in the level thereof. With this, the distortion of the figure mentioned above can be compensated, by means of the said free shaped surface mirror.

Also, the distance between the points P13 and P14 (hereinafter, this is assumed to be "Lx") can be obtained, approximately, from the following equation 2.

$$Lx = Dv \cdot (\sin \theta)/(\cos \theta') \quad \text{(Eq. 2)}$$

Herein, "θ" is a half angle of field of the image display element 20 after being emitting from the free shaped surface mirror, on the cross-section shown in FIG. 2. For example, if deterring a value of the half angle of field to be about 30 degree, by taking the structure, etc., in the projection optical units of the color image display apparatus, which are widely available on markets, in general, into the consideration thereof, then the above equation 2 is as shown by the following equation 3.

$$Lx = 1.2 \cdot (\sin \theta)/Dv \quad \text{(Eq. 3)}$$

Further, the approximation mentioned above also includes a condition therein, that the free shaped surface mirror is disposed at a position, being fully far from the screen. However, in case where this free shaped surface mirror is near to the screen, the difference in the optical path length mentioned above comes downs to a smaller value. Accordingly, it can be seen, the condition is in that the difference in the optical path length is smaller than the value of the above equation. With this, it is possible to achieve the compensation upon the trapezoidal distortion due to the oblique projection of the projection light, but without increasing the eccentricity of lens and/or the lens diameter within the first optical system, including plural numbers of refraction lenses therein. Namely, according to the present embodiment, it is possible to obtain the projection optical unit, being small in the depth of the optical system, and being producible with ease.

Herein, explanation will be made further, about the condition of bringing the free shaped surface mirror to be small in the size thereof, sufficiently, so as to obtain the projection optical unit, which can be manufactured further easily.

Figure 3:
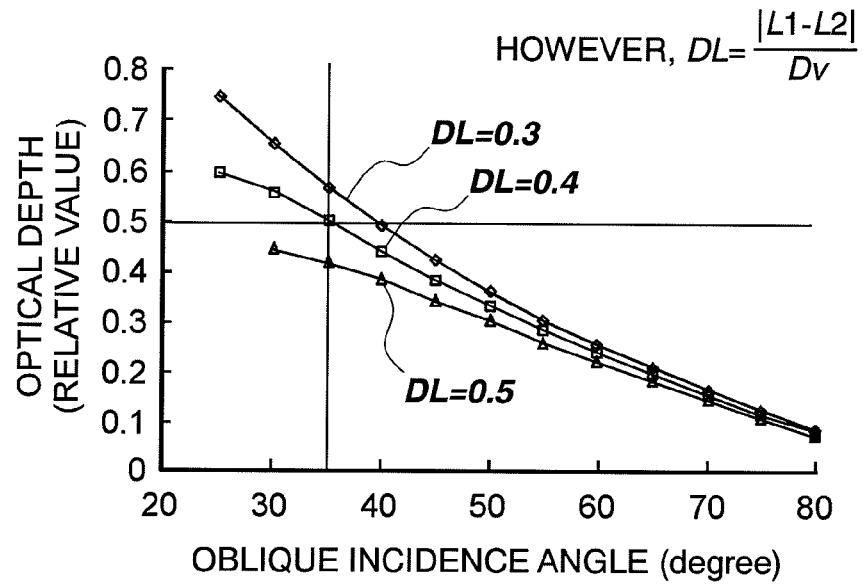
FIG. 3 is a view for showing changes in the optical depth with respect to an oblique or inclined incident angle, within the projection optical unit mentioned above.

FIG. 3 attached herewith shows the value of depth varying accompanying therewith, when the oblique incidence angle "θ" changes, within the optical system, in which the trapezoidal distortion is compensated with using the free shaped surface mirror (i.e., the first free shaped surface mirror 3 and the second free shaped surface mirror 4), as is shown in FIG. 1. The value of depth is the minimum value within the apparatus, which can be obtained, actually. Thus, the horizontal axis of a graph in this figure depicts the oblique incidence angle "θ". On the other hand, the vertical axis thereof shows the length of depth, and herewith, the length of depth is shown in the absolute value thereof, after being normalized through the "Dv", i.e., the size of the image plane on the screen, within the cross-section shown in FIG. 1 mentioned above. However, the depth shown herein is calculated out from the routes of light beams as a result of adjustment of the rear-surface mirror 5, through coaxial calculation, under the condition that no interference occurs between the light beams themselves, which are bent upon the rear-surface mirror 5. Of course, there is not included, such as, a lens tube and/or mirror thickness, etc. Hereinafter, this is called by "optical depth".

Namely, as is shown in this FIG. 3, it can be seen that, the larger the "oblique incidence angle θ", the smaller the depth of the optical system (i.e., the optical depth) can be obtained, building up the projection optical unit. Further, the depth of this optical system differs depending on a spreading angle defined between the light beam 13 directing to the upper portion of the image plane on the screen 6 and the light beam directing to the lower portion thereof, in FIG. 1 mentioned above. And, this spreading angle is, as was mentioned above, is equal to the difference |L1−L2| in the optical path length of the light beam directing to the upper end of the screen plate and the light beam direction to the lower end thereof, in the optical system applying the reflection surface of the free shaped surface configuration therein, according to the present invention. Then, in this FIG. 3, assuming that a parameter of the difference in the optical path length is "DL", there is shown changing of the depth thereof when the difference |L1−L2| is changed. Thus, it is indicated that, the larger the optical path length (i.e., the value of "DL"), the smaller the depth of the optical system can be made. However, the "DL" is the value obtained through dividing the difference |L1-L2| by the size of the image plane "Dv" (i.e., DL=|L1−L2|/Dv).

Herein, as the optical system of brining the depth of the apparatus to be small, greatly, for example, for reducing the optical depth down to be equal or less than 0.5 time of the size of the screen image plane, then from FIG. 3 mentioned above, it can be seen that the "oblique incidence angle θ" be equal to 35 degree or greater than that (however, in the case where the difference of optical path length is (DL=0.4)), preferably.

On the other hand, about the free shaped surface mirror mentioned above, the larger the size, the more difficult the production thereof. For this reason, it is important the said free shaped surface mirror is made in the size to be equal to or less than a predetermined size thereof. Within the structure shown in FIG. 1, for example, the size of the rear-surface mirror 5 comes up to be about 70% or greater than that of the image plane on the screen. When applying this into a rear projection having a large screen of 50 inches or larger than that, then this rear-surface mirror 5 exceeds 500 mm, in the size thereof. For this reason, it is difficult to process the front surface of the rear-surface mirror 5 into such the free shaped surface configuration, of satisfying the condition mentioned above. Thus, manufacturing of the free shaped surface mirror having such the size is difficult, from an actual or practical viewpoint. In other words, within the rear projection having such the structure as shown in FIG. 1, it is improper to form the rear-surface mirror 5 into the free shaped surface.

Then, according to the present embodiment, as is shown in FIG. 1 mentioned above, the free shaped surface mirror is disposed on the optical path before the optical path thereof is bent upon the said rear-surface mirror. In more details, it is proposed to dispose free shapes surface mirror in the vicinity of the lower portion of the screen 6. Further, it is also proposed to build up this free shaped surface mirror with the first free shaped surface mirror 3 and the second free shaped surface mirror 4, to be disposed in the vicinity of the lower portion of the screen 6. However, even with such the disposition and the structures of the free shaped surface mirror, there are cases that the size of the said free shaped surface mirror comes to be too large, from a viewpoint of manufacturing thereof, depending upon the conditions.

Figure 4:
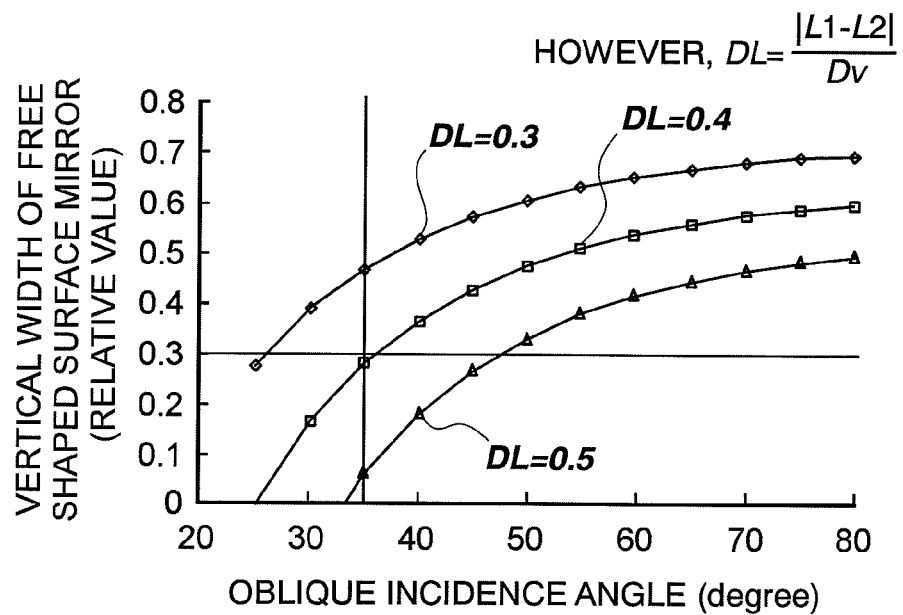
FIG. 4 is a view for showing changes in sizes of a free shaped surface mirror with respect to an oblique or inclined incident angle, within the projection optical unit mentioned above.

A result of obtaining the changes in the size of the larger free shaped surface mirror, i.e., the second free shaped surface mirror 4, with respect to the "oblique incidence angle θ", is shown in FIG. 4, for example, within the disposition and the structures shown in FIG. 1 mentioned above. However, in this FIG. 4, the horizontal axis thereof is the "oblique incidence angle θ", and the vertical axis thereof shows the size, which is necessary for the said free shaped surface mirror. Herein, the size of the free shaped surface mirror means a size within the cross-section (i.e., the distance from the point P3 to the point O6) as is shown in FIG. 1 mentioned above, and is displayed after being normalized by the size of the image plane on the screen within the said cross-section.

As is shown in this FIG. 4, it can be seen that the size of the free shaped surface mirror increases as the "oblique incidence angle θ" comes to be large. Also, in case where the difference |L1−L2| in the optical path length is different, it is apparent that, the larger the difference in the optical length thereof, the smaller the size of the free shaped surface mirror can be made.

By the way, in the case of the rear projector having a large screen, such as, of the type of 50 inches, for example, being constructed as shown in FIG. 1 mentioned above, it is preferable to reduce the size of the free shaped surface mirror 4 (i.e., a size within the cross-section shown in FIG. 1, as being a shorter side thereof) down to be equal or less than 0.3 time, approximately, of the image plane size on the screen, from a viewpoint of manufacturing the free shaped surface mirror, easily.

Then, seeing the FIG. 4 mentioned above, while paying such the condition into the consideration, in case when the difference in the optical path length is 0.4, it is necessary to make the oblique incidence angle "θ" equal to 35 degree or less than that. On the other hand, it can be seen that, in case when this difference in the optical path length is 0.5, the said oblique incidence angle "θ" can be made large, up to the vicinity of 50 degree.

Herein, in addition to the graph shown in FIG. 3, if putting also the graph shown in FIG. 4 side by side, for making the "optical depth" mentioned above small, it is desirable to make set this oblique incidence angle "θ" to be large. On the other hand, for making the size of the free shaped surface mirror small, it is necessary to set this oblique incidence angle "θ" to be small. Thus, it can be seen that both of them have a tendency of being reciprocal to the oblique incidence angle "θ". Accordingly, it also can be seen that, depending on the condition, there is a case when it is impossible to make both, the depth and the size of the free shaped surface mirror, equal or less than a desired size thereof, at the same time.

Then, paying an attention onto the difference |L1−L2| in the optical path length (i.e., DL=|L1−L2|/Dv, strictly), being the parameter mentioned above, it can be seen that both the optical depth and also the size of the free shaped surface mirror alter into a direction of being small, as the difference in the optical path length comes to be large. Accordingly, for satisfying the condition of the both, it is preferable to make the difference in the optical path length large.

Thus, from the graphs shown in FIGS. 3 and 4, it can be understood that there is a range or region of the oblique incidence angle "θ", satisfying two (2) conditions; i.e., (1) making the optical depth, being equal or less than a target value, and (2) also making the size of the free shaped surface mirror, being equal or less than an easily producible one. And, it can be understood that, for determining such the oblique incidence angle "θ", the difference |L1−L2| in the optical path length (i.e., DL=|L1−L2|/Dv, strictly) is equal or greater than 0.4, preferably.

However, in the above, explanation was made upon basis of the structure, in which the bending direction of the optical path upon the free shaped surface mirror lies within a plane including the shorter side of the image (i.e., in the vertical direction), as was shown in the embodiment shown in FIG. 1 mentioned above. However, also in case of the structure, which includes the bending direction of the optical path within a plane including a longitudinal side of the image plane (i.e., the horizontal direction), on the contrary to FIG. 1 mentioned above, it is apparent that they can be constructed in such the manner as was mentioned above. Thus, in such the structure, it is possible to make the free shaped surface mirror small in the size while bringing the depth thereof to be small. Accordingly, with such the structure, it is needless to say that it is possible to obtain the optical system, which can be manufactured, easily. Namely, from the mentioned above, there can be obtained the optical unit, enabling to make the depth of the rear-surface projection type image display apparatus, and also, making the free shaped surface mirror small in the size, at the same time; thereby being producible easily.

Further, hereinafter, explanation will be made about the detailed embodiment of the optical unit within the rear-surface projection type image display apparatus according to the present invention, which was explained in the above, by referring numerical values of various parts thereof, in more details thereof.

Embodiment 1

Figure 5:
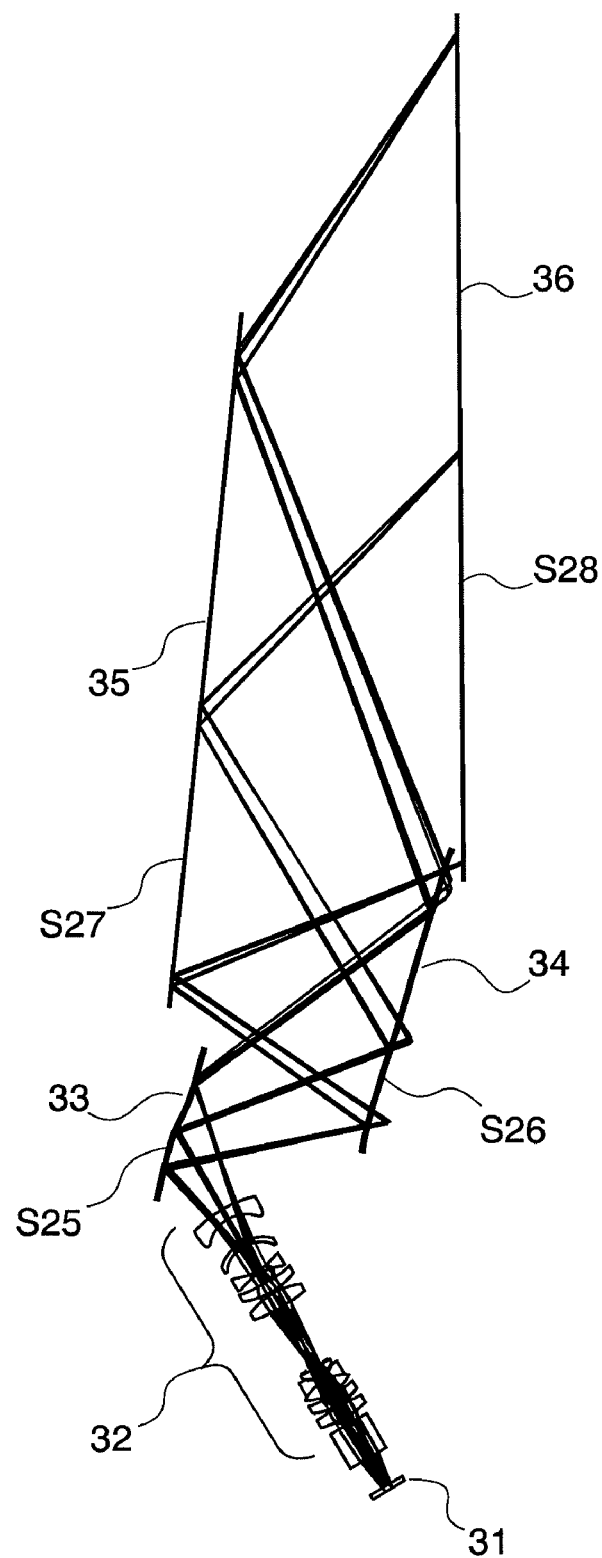
FIG. 5 is a view for showing the structure of the projection optical unit and an optical path therein, according an embodiment 1 of the present invention.

Referring to FIGS. 5-7 and 12 attached, and further the numerical values shown in Table 1 below, explanation will be made about an embodiment 1. However, in FIG. 5 is shown a schematic diagram of light beams within the present embodiment 1. Thus, the light beam emitted from the image display element, which is disposed in a lower side in the figure, passes through a first optical system 32, which is built up with plural numbers of refraction lenses. Thereafter, it is reflected upon a free shaped surface mirror 33, which builds up a second optical system, and further reflected upon a second free shaped surface mirror 34. Then, it is reflected upon the surface of a rear-surface mirror 35, being a plane mirror, and is incident upon the screen 36.

Herein, the first optical system mentioned above is a coaxial optical system constructed with refraction surfaces, all of which are coaxial in the configuration. Further, four (4) within those refraction surfaces are constructed with aspheric surfaces, each being axially symmetric, and others thereof are constructed with spherical surfaces. Also, the aspheric surface being axially symmetric can be expressed by the following equation 4, while using a cylindrical coordinate system local to each of the surfaces:

$$Z = \frac{cr^2}{1+\sqrt{1-(1+k)c^2r^2}} + A \cdot r^4 + B \cdot r^6 + C \cdot r^8 + \qquad \text{(Eq. 4)}$$
$$D \cdot r^{10} + E \cdot r^{12} + F \cdot r^{14} + G \cdot r^{16} + H \cdot r^{18} + J \cdot r^{20}$$

where, "r" is the distance from an optical axis, and "Z" is an amount of sag, respectively. And, "c" is the curvature at a peak, "k" is a conical constant, and "A" to "J" are coefficients of terms of powers of "r", respectively.

Next, the free shaped surfaces constructing the second optical system mentioned above can be expressed by the following equation 5, including multinomial equations of "X" and "Y" therein, with using a local orthogonal coordinates (x, y, z) having an origin at the peak point of each of the surfaces.

$$Z = \frac{cr^2}{1+\sqrt{1-(1+k)c^2r^2}} + \sum_m \cdot \sum_n (C(m,n) \cdot x^m \cdot y^n) \qquad \text{(Eq. 5)}$$

where, "Z" is an amount of sag amount of the free shaped surface configuration, in the direction perpendicular to the X-axis and Y-axis, "c" the distance within a plane of XY-axes, "k" the conical constant, and "C(m, n)" a coefficient of the multinomial, respectively.

Figure 12:
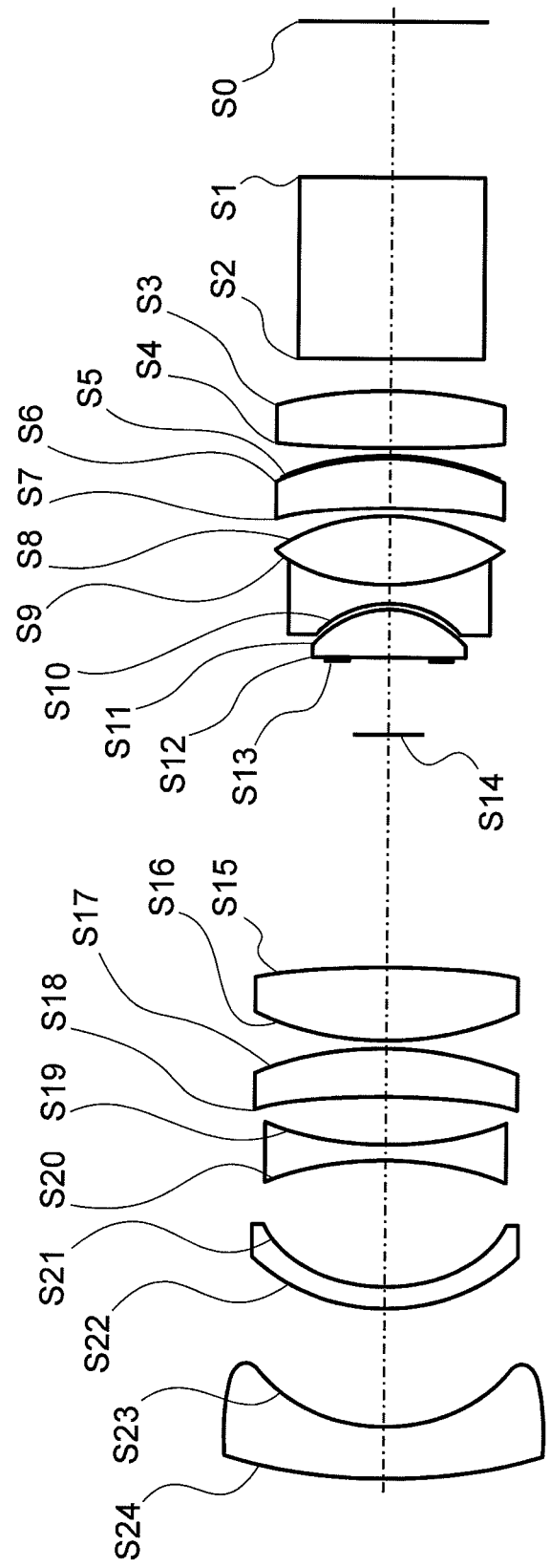
FIG. 12 shows an example of the projection lens, according to the present embodiment.

Further, FIG. 12 shows an example of structure of the projection lens, according to the present embodiment 1, and also in the Table 1 below, there are shown numerical values, including the lens data therein, of building up the optical unit according to the present embodiment 1. Herein, regarding surface numbers (Surface), the surfaces of substances are indicated by marks "S0" to "S28", sequentially; i.e., the display surface of the image display element is "S0", for example. Among of those, "S0" to "S24" are corresponding to the surfaces of the respective optical elements, which are shown by "S0" to "S24" in FIG. 12. "S1" and "S2" are incident/exit surfaces of a light composition portion, including a dichroic mirror, therein, for composing or synthesizing the display image of three (3) image display elements, for example. "S25" to "S28" are corresponding to the surfaces of the respective optical elements (i.e., a reflection surface, a screen surface), which are shown by "S0" to "S24" in FIG. 5. Thus, "S25" indicates the reflection surface of the first free shaped surface mirror 33, "S26" the reflection surface of the second free shaped surface mirror 34, "S27" the reflection surface of the plane reflection mirror 35, and "S28" is an image surface, i.e., the screen surface, respectively. Also, in this Table 1, "Rd" indicates the curvature radius of the each surface, and it is shown by a positive value when the said surface has a center of curvature on the left-hand side in FIG. 5 mentioned above, on the other hand a negative value when it is contrary to that. Also, in the Table 1 below, "TH" indicates the distance between the coming surface, and in more details, it indicates the distance from the peak on that lens surface to the peak on the next lens surface. Further, in the Table 1, "nd" indicates the refractive index of each of the lens elements, which are shown in FIG. 12, and "vd" an Abbe number of the lens element, respectively.

TABLE 1

| Surface | Rd | TH | nd | vd |
|---|---|---|---|---|
| S0 | Infinity | 26.648 | | |
| S1 | Infinity | 31.342 | 1.51680 | 64.2 |
| S2 | Infinity | 5.000 | | |
| S3 | 69.501 | 10.611 | 1.84666 | 23.8 |
| S4 | −346.318 | 0.878 | | |
| S5 | 46.651 | 0.176 | 1.52020 | 52.0 |
| S6 | 44.766 | 9.698 | 1.49700 | 81.6 |
| S7 | 127.627 | 0.896 | | |
| S8 | 39.691 | 12.175 | 1.49700 | 81.6 |
| S9 | −43.950 | 3.514 | 1.75520 | 27.5 |
| S10 | 19.725 | 0.878 | | |
| S11 | 20.067 | 8.503 | 1.49700 | 81.6 |
| S12 | 689.692 | 0.176 | 1.52020 | 52.0 |
| S13 | 886.801 | 13.352 | | |
| S14 | Infinity | 41.092 | | |
| S15 | 172.780 | 13.158 | 1.65412 | 39.6 |
| S16 | −54.522 | 0.914 | | |
| S17 | 65.972 | 8.766 | 1.84666 | 23.8 |
| S18 | 141.037 | 7.835 | | |
| S19 | −75.773 | 3.514 | 1.74400 | 44.7 |
| S20 | 63.046 | 22.101 | | |
| S21 | −29.490 | 3.514 | 1.62041 | 60.3 |
| S22 | −38.329 | 21.310 | | |
| S23 | −28.154 | 8.784 | 1.49091 | 58.0 |
| S24 | −104.400 | 71.000 | | |
| S25 | Infinity | −184.324 | REFL | |
| S26 | Infinity | 295.000 | REFL | |
| S27 | Infinity | −305.000 | REFL | |
| S28 | Infinity | −0.028 | | |

However, in FIGS. 5 and 12 mentioned above, this distance between the surfaces is indicated by a positive value, when the next lens surface lies on the left-hand side with respect to the said lens surface, on the other hand, it is indicated by a negative value when it lies on the right-hand side.

Further, in the Table 1 mentioned above, four (4) surfaces, i.e., S7, S15, S 23 and S24 are made up with the aspheric surfaces, each being rotationally symmetric, as was mentioned above. And, the coefficients of aspheric surfaces of those four (4) will be shown in a Table 2 below.

TABLE 2

| Surface | | | Aspheric Surface Coefficients | | | | | |
|---|---|---|---|---|---|---|---|---|
| S5 | K | 1.500680822 | C | −8.24339E−13 | F | 1.61598E−20 | J | −1.93321E−27 |
| | A | −8.3275E−07 | D | −3.56542E−15 | G | 1.35042E−22 | | |
| | B | 2.23608E−10 | E | −5.78524E−18 | H | 2.8807E−25 | | |
| S13 | K | −10391.2727 | C | −4.99381E−11 | F | 1.69886E−18 | J | −3.05003E−23 |
| | A | 8.03455E−6 | D | −1.73066E−13 | G | 8.0916E−20 | | |
| | B | 1.00416E−08 | E | −1.61553E−15 | H | 3.57997E−21 | | |
| S23 | K | −0.80933684 | C | −8.243E−13 | F | 4.63854E−22 | J | 5.64589E−29 |
| | A | −7.4205E−07 | D | −6.15312E−16 | G | 4.18233E−24 | | |
| | B | −5.2292E−10 | E | −5.01633E−19 | H | 1.68124E−26 | | |
| S24 | K | 2.01004872 | C | −4.54763E−14 | F | 1.00003E−22 | J | 1.82161E−31 |
| | A | 2.57707E−07 | D | −4.02986E−17 | G | 1.94643E−25 | | |
| | B | −1.888E−10 | E | 1.89957E−20 | H | 2.44674E−28 | | |

Also, in the Table 1 mentioned above, as was mentioned above, S 25 and S 26 show the reflection surfaces having the free shaped surface configurations on the first free shaped surface mirror 33 and the second free shaped surface mirror 34, building up the second optical system in FIG. 5. Hereinafter, detailed explanation will be made about the configurations of free shaped surfaces of those reflection surfaces.

First, the free shaped surface of S25 (i.e., the first free shaped surface mirror 33) is disposed at a position, being separated from S24 by the surface-to-surface distance (i.e., the TH) shown in the Table, while putting the origin of the local coordinates on the optical axis of the first optical system. Accordingly, the light beam, emitting from the center of image plane of the image display element 31 and then passing through the optical axis of the first optical system 32 (hereinafter, being called by a "central light beam"), enters into the origin of the local coordinates of S25 mentioned above.

On the other hand, the Y-axis and the Z-axis of the local coordinates of S26 lie within the cross-section shown in FIG. 5 mentioned above, and the Z-axis is disposed, being inclined by around 40 degree with respect to the central light beam mentioned above. And, the free shaped surface of S26 locates on the route of the central light beam reflected upon the surface S25, the origin of the local coordinates thereof, and further it is disposes at a position, being separated from the surface S25 mentioned above, by the surface-to-surface distance (i.e., the TH) shown therein. Thus, the Y-axis and the Z-axis of the local coordinates of this S26 lie within the cross-section shown in FIG. 5 mentioned above, and further the Z-axis is disposed, being inclined by around 40 degree with respect to the central light beam incident upon the $26^{th}$ surface.

Values of the coefficients, indicative of the configurations of those two (2) free shaped surfaces, are shown in a Table 3 below.

too much, duplication is caused on the functions of the coefficients, being parameters of both, the capacity for compensating the distortion is restricted, and therefore, it is impossible to compensate the trapezoidal compensation, favorably.

Also, as an angle of view of the first optical system 32 mentioned above, it is preferable to determine the angle to be equal or less than 15 degree, being defined between the optical axis and the light beam, which emits from the upper end of the image screen of the image display element 31 and passes through an incidence pupil of the said first optical system. With this, it is possible to maintain the distance between the two (2) pieces of the free shaped surface mirrors, as well as, to maintain the sizes of the free shaped surface mirrors small.

Further, from the Tables 1 and 3, it can be seen that the curvature "c" and the conic coefficient "k" are zero (0), in the present embodiment 1. This is because the trapezoidal distortion caused due to the oblique incidence is generated, extremely in large, in the direction of the oblique incidence, but an amount of distortion is small in the vertical direction different therefrom. Accordingly, there are needed functions, being greatly different from each other, in the direction of the oblique incidence and the direction perpendicular thereto, and it is possible to compensate the figure distortion, preferably, without utilizing the curvature "c" and the conic coefficient "k" therein, which are rotationally symmetric and function in all directions.

Also, further in the optical system of the embodiment 1 mentioned above, the mirror S25 and the mirror of the surface S26 are disposed almost in parallel with, in particular, the axes of the local coordinates thereof, and with this, it is possible to compensate a spot configuration, as well as, the picture distortion, preferably.

Figure 6:
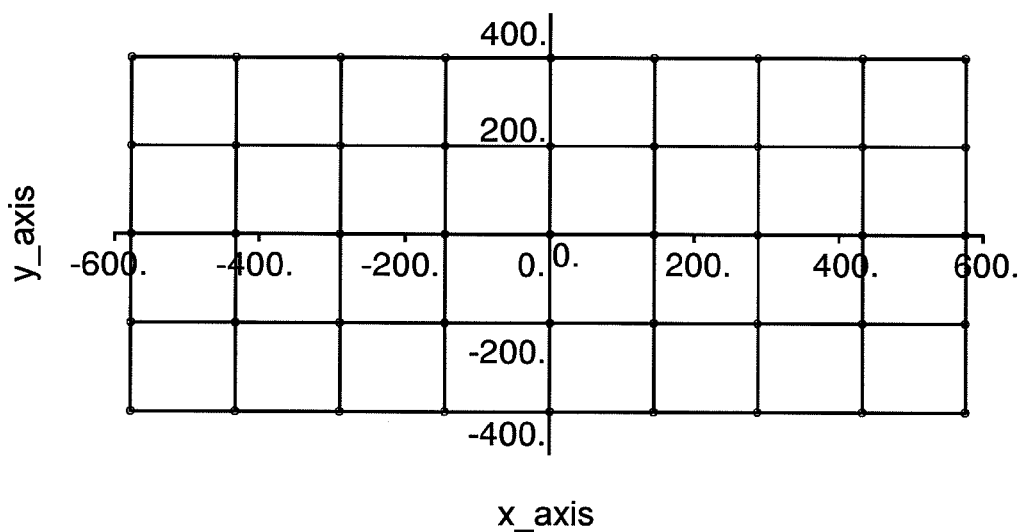
FIG. 6 is a view for showing distortion property within the projection optical unit, according the embodiment 1 of the present invention.
Figure 7:
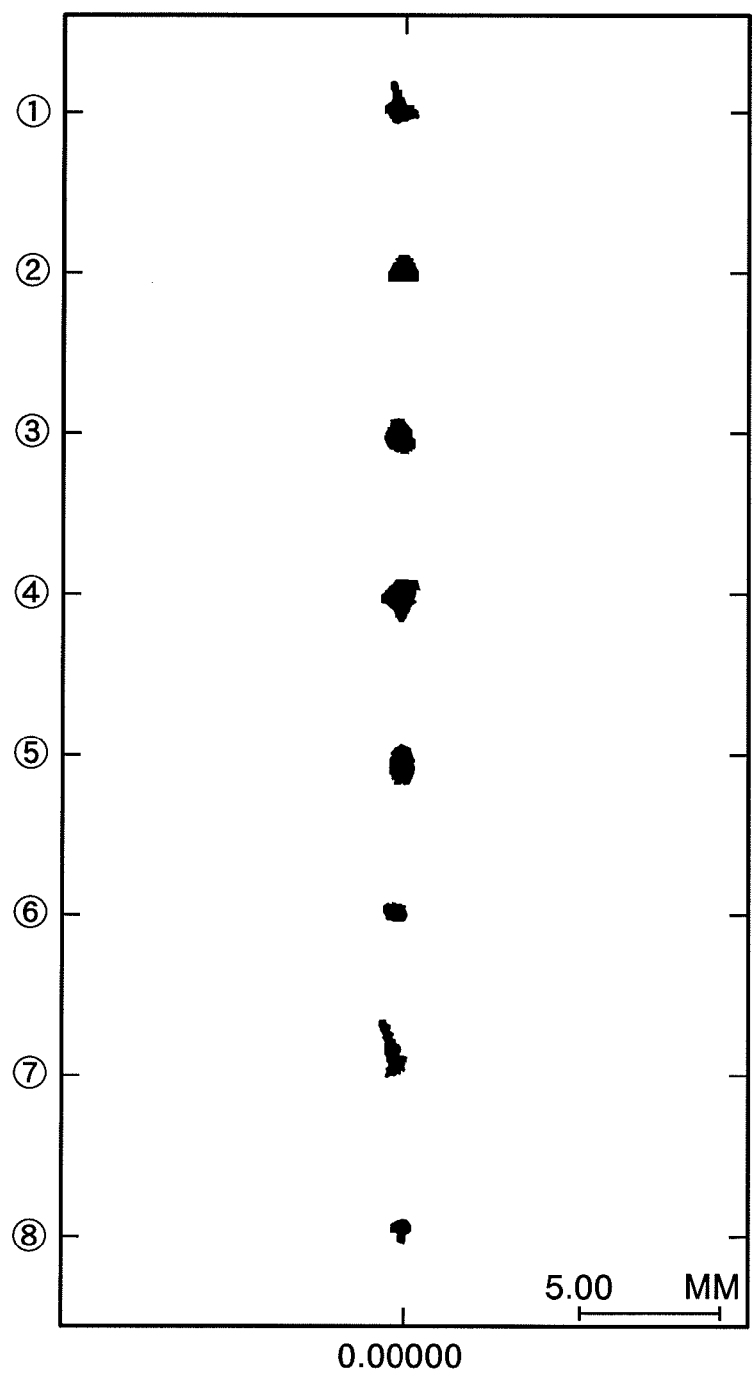
FIG. 7 is a view for showing spot property within the projection optical unit, according the embodiment 1 of the present invention.

Condition of the picture distortion will be shown in FIG. 6 attached, obtained from the optical system according to the present embodiment 1, the numerical values of which are shown in details thereof, above. However, the vertical direction (i.e., the y-axis) in FIG. 6 corresponds to the vertical

TABLE 3

| Surface | | | Free Shaped Surface Coefficients | | | | | |
|---|---|---|---|---|---|---|---|---|
| S25 | | | C17 | 3.97589E−10 | C34 | −5.28699E−13 | C51 | 7.9672E−17 |
| | K | 0 | C19 | 1.38201E−09 | C36 | −2.88117E−15 | C53 | 1.26856E−16 |
| | C4 | −0.000069127 | C21 | 4.54608E−09 | C37 | 1.79988E−15 | C55 | 7.52318E−16 |
| | C6 | −0.0001909 | C22 | −6.4426E−12 | C39 | 2.49E−15 | C56 | −3.27811E−19 |
| | C8 | −9.2333E−06 | C24 | 1.51157E−11 | C41 | −8.82702E−15 | C58 | −1.40336E−18 |
| | C10 | −8.2751E−06 | C26 | 1.70954E−11 | C43 | −1.81468E−15 | C60 | 2.6418E−19 |
| | C11 | 5.35449E−08 | C28 | 1.51335E−12 | C45 | 1.44137E−14 | C62 | 2.53399E−18 |
| | C13 | −3.1103E−08 | C30 | 4.52321E−13 | C47 | −1.04893E−16 | C64 | 1.6311E−19 |
| | C15 | −1.6043E−08 | C32 | −6.12012E−14 | C49 | −5.79322E−17 | C66 | 7.9022E−18 |
| S26 | | | C17 | 4.6176E−10 | C34 | 7.67414E−15 | C51 | 4.78267E−19 |
| | K | 0 | C19 | −2.516E−10 | C36 | −4.95185E−16 | C53 | 1.7748E−19 |
| | C4 | −0.00152375 | C21 | −1.26156E−11 | C37 | 1.17737E−17 | C55 | −1.35846E−18 |
| | C6 | −0.000023622 | C22 | −5.60687E−13 | C39 | −1.8562E−16 | C56 | −2.07357E−22 |
| | C8 | −1.3215E−05 | C24 | 5.9598E−12 | C41 | 1.10968E−16 | C58 | 3.30436E−22 |
| | C10 | −4.8572E−06 | C26 | 7.73069E−13 | C43 | 3.95986E−17 | C60 | −5.48769E−21 |
| | C11 | 2.5034E−08 | C28 | 1.30848E−12 | C45 | −1.71225E−16 | C62 | 3.14467E−21 |
| | C13 | −8.124E−08 | C30 | −9.81285E−15 | C47 | 1.59137E−20 | C64 | 3.02674E−22 |
| | C15 | −3.1293E−08 | C32 | 3.92768E−14 | C49 | −1.61716E−18 | C66 | −3.14013E−21 |

As was mentioned above, in the present embodiment 1, the distance between the two (2) free shaped surface mirrors (i.e., the first free shaped surface mirror 33 and the second free shaped surface mirror 34) is determined to be about 180 mm, however for compensating the trapezoidal distortion, favorably, it is desirable that the distance between the two (2) free shaped surface mirrors is equal or greater than 150 mm. This is due to, if the two (2) free shaped surface mirrors come close (up-down) direction in FIG. 5; on the other hand, the horizontal direction thereof (i.e., the x-axis) shows the depth direction in FIG. 5. Also, a center of an oblong shown in this figure shows the center of the projection image screen or plane. And, in this figure is shown the condition of compensation upon the picture distortion, which is obtained by means of the free shaped surface mirrors (i.e., the mirror of S25 and the mirror 34 of S26), through showing winding conditions of straight lines, which divide the projection image screen into four (4) in the vertical direction and eight (8) in the horizontal direction.

Further, a spot diagram within the present embodiment 1 mentioned above will be shown in FIG. 7 attached. In this FIG. 7, there are shown the configurations of spot diagrams, which are indicated by numerals from (1) to (8), from above. Thus, the spot diagrams of light beams emitting or exiting from eight (8) points on the surface of the image display element 31 are shown, sequentially; in more details, (1, 1), (0, 1), (0.6, 0.6), (1, 0), (0.6, −0.6), (1, −1) and (0, −1) in the relative values on that xy coordinates, from above in the figure. However, the horizontal direction on each of the spot diagrams shows the x-direction on the screen, while the vertical direction thereof shows the y-direction on the screen.

From the above, it can be seen that the optical unit according to the present embodiment 1 mentioned above shows preferable performances or characteristics.

Embodiment 2

Next, detailed explanation will be given about a second embodiment of the optical unit, by referring to FIGS. 8-10 and 12, and also Tables 4-6, which will be shown below.

Figure 8:
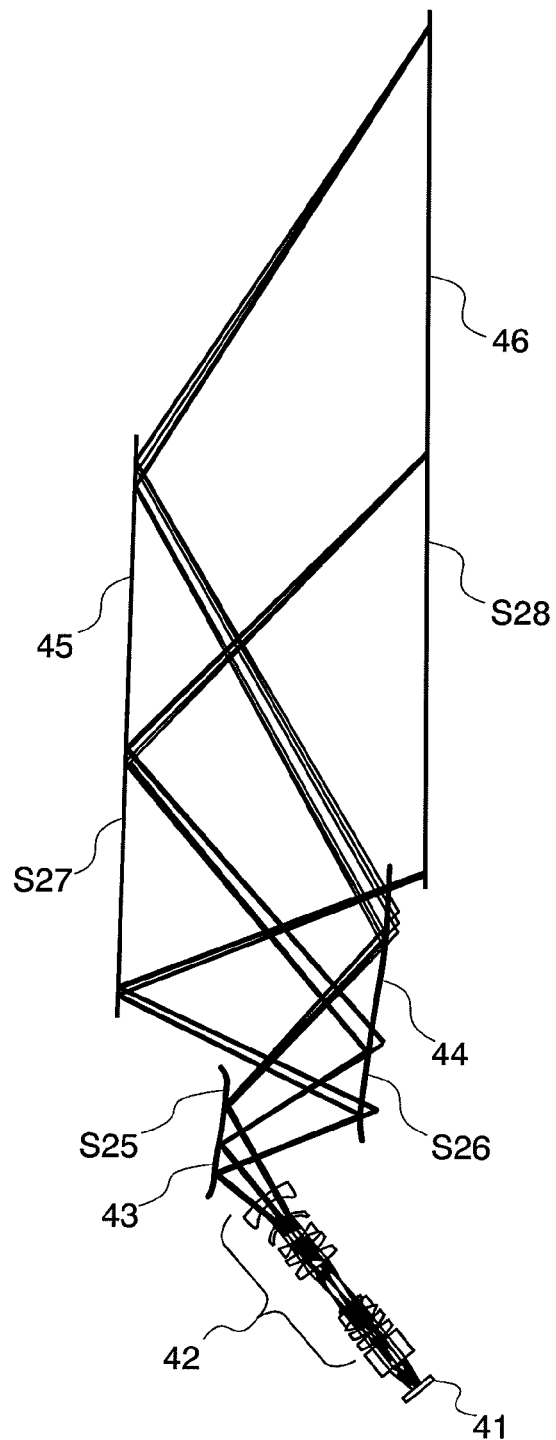
FIG. 8 is a view for showing the structure of the projection optical unit and an optical path therein, according an embodiment 2 of the present invention.

First of all, FIG. 8 shows the schematic diagram of the light beams within the present embodiment 2. Thus, the light emitting from an image display element 41 passes through a first optical system 42 including plural numbers of lenses therein. Thereafter, it is reflected upon a first free shaped surface mirror 43 within a second optical system, and further upon a second free shaped surface mirror 44. And after being reflected upon a rear-surface mirror 45, being a plane mirror, it is incident upon a screen 46.

Herein, the first optical system mentioned above is a coaxial optical system constructed with refraction surfaces, all of which are coaxial in the configuration. Further, four (4) within those refraction surfaces are constructed with aspheric surfaces, each being axially symmetric, and others thereof are constructed with spherical surfaces. Also, the aspheric surface being axially symmetric can be expressed by using the equation 4, which was shown in the above, while using a cylindrical coordinate system local to each of the surfaces.

Next, the free shaped surfaces constructing the second optical system mentioned above can be expressed by the equation 5, which was already shown in the above, including multinomial equations of "X" and "Y" therein, with using a local orthogonal coordinates (x, y, z) having an origin at the peak point of each of the surfaces.

Further, in the Table 4 below, there are shown numerical values, including the lens data therein, of building up the optical unit according to the present embodiment 2. Herein, also "S0" to "S24" shown in the Table 4 are corresponding to the surfaces of the respective optical elements shown by "S0" to "S24" in FIG. 12. Regarding surface numbers (Surface), while indicating the surface of the image display element by "0", the surfaces of substances are indicated from "S1" to "S27", sequentially, wherein "S28" indicates an image surface, i.e., the surface of the screen. Also, in the similar manner as in the embodiment 1 mentioned above, "S25" indicates the reflection surface of the first free shaped surface mirror 43, "S26" the reflection surface of the second free shaped surface mirror 44, and "S27" the reflection surface of the plane reflection mirror 45, respectively. Also, in this Table 4, "Rd" indicates the curvature radius of the each surface, and it is shown by a positive value when the said surface has a center of curvature on the left-hand side in FIG. 8 mentioned above, on the other hand a negative value when it is contrary to that. Also, in the Table 4, "TH" indicates the distance between the coming surface, and in more details, it indicates the distance from the peak on that lens surface to the peak on the next lens surface. However, also in this FIG. 8, when the next lens surface lies on the left-hand side, with respect to the said lens surface, the distance between those surfaces is shown by a positive value, on the other hand, it lies on the right-hand side by a negative value thereof. Also, in the similar manner in the Table 1, "nd" indicates the refractive index of each of the lens elements, which are shown in FIG. 12, and "vd" an Abbe number of the lens element, respectively.

TABLE 4

| Surface | Rd | TH | nd | vd |
|---|---|---|---|---|
| S0 | Infinity | 26.648 | | |
| S1 | Infinity | 31.342 | 1.51680 | 64.2 |
| S2 | Infinity | 4.945 | | |
| S3 | 69.501 | 10.611 | 1.84666 | 23.8 |
| S4 | −346.318 | 0.878 | | |
| S5 | 46.651 | 0.176 | 1.52020 | 52.0 |
| S6 | 44.766 | 9.698 | 1.49700 | 81.6 |
| S7 | 127.627 | 0.896 | | |
| S8 | 39.691 | 12.175 | 1.49700 | 81.6 |
| S9 | −43.950 | 3.514 | 1.75520 | 27.5 |
| S10 | 19.725 | 0.878 | | |
| S11 | 20.067 | 8.503 | 1.49700 | 81.6 |
| S12 | 689.692 | 0.176 | 1.52020 | 52.0 |
| S13 | 886.801 | 13.352 | | |
| S14 | Infinity | 41.092 | | |
| S15 | 172.780 | 13.158 | 1.65412 | 39.6 |
| S16 | −54.522 | 0.914 | | |
| S17 | 65.972 | 8.766 | 1.84666 | 23.8 |
| S18 | 141.037 | 7.835 | | |
| S19 | −75.773 | 3.514 | 1.74400 | 44.7 |
| S20 | 63.046 | 22.101 | | |
| S21 | −29.490 | 3.514 | 1.62041 | 60.3 |
| S22 | −38.329 | 21.310 | | |
| S23 | −28.154 | 8.784 | 1.49091 | 58.0 |
| S24 | −104.400 | 71.055 | | |
| S25 | Infinity | −188.359 | REFL | |
| S26 | Infinity | 3959.251 | REFL | |
| S27 | Infinity | −456.800 | REFL | |
| S28 | Infinity | | | |

Also, in the Table 4 mentioned above, S7, S15, S 23 and S24 are in the aspheric surfaces being rotationally symmetric, and the coefficients of aspheric surfaces of those four (4) will be shown in a Table 5 below.

TABLE 5

| Surface | | | Aspheric Surface Coefficients | | | | | | |
|---|---|---|---|---|---|---|---|---|---|
| S5 | K | 1.500680822 | C | −8.24339E−13 | F | 1.61598E−20 | J | −1.9332E−27 |
| | A | −8.32748E−07 | D | −3.56542E−15 | G | 1.35042E−22 | | |
| | B | 2.23608E−10 | E | −5.78524E−18 | H | 2.8807E−25 | | |
| S13 | K | −10391.2727 | C | −4.99381E−11 | F | 1.69886E−18 | J | −3.05E−23 |
| | A | 8.03455E−6 | D | −1.73066E−13 | G | 8.0916E−20 | | |
| | B | 1.00416E−08 | E | −1.61553E−15 | H | 3.57997E−21 | | |

TABLE 5-continued

| Surface | | | Aspheric Surface Coefficients | | | | | |
|---|---|---|---|---|---|---|---|---|
| S23 | K | −0.809336837 | C | −8.243E−13 | F | 4.63854E−22 | J | 5.64589E−29 |
| | A | −7.42052E−07 | D | −6.15312E−16 | G | 4.18233E−24 | | |
| | B | −5.2292E−10 | E | −5.01633E−19 | H | 1.68124E−26 | | |
| S24 | K | 2.01004872 | C | −4.54763E−14 | F | 1.00003E−22 | J | 1.82161E−31 |
| | A | 2.57707E−07 | D | −4.02986E−17 | G | 1.94643E−25 | | |
| | B | −1.88796E−10 | E | 1.89957E−20 | H | 2.44674E−28 | | |

Also, in the Table 5 mentioned above, S 25 and S 26 build up the second optical system, thereby each having the reflection surface of the free shaped surface configuration.

First, the free shaped surface of S25 (i.e., the first free shaped surface mirror 43) is disposed at a position, being separated from S24 by the surface-to-surface distance (i.e., the TH) shown in the Table, while putting the origin of the local coordinates on the optical axis of the first optical system. Accordingly, the light beam, emitting from the center of image plane of the image display element 41 and then passing through the optical axis of the first optical system 42 enters into the origin of the local coordinates of S25 mentioned above. Also, the Y-axis and the Z-axis of the local coordinates of S25 lie within the cross-section shown in FIG. 8 mentioned above, and the Z-axis is disposed, being inclined by around 40 degree with respect to the central light beam mentioned above.

Next, the free shaped surface of S26 (i.e., the second free shaped surface mirror 44) is located, disposing the origin of the local coordinates thereof at a position separated from S25 by the surface-to-surface distance (i.e., the TH) shown in the table, on the route of the central light beam reflected upon the surface S25. The Y-axis and the Z-axis of the local coordinates of the S26 are also lie within the cross-section shown in FIG. 8 mentioned above, and the Z-axis thereof is also disposed, being inclined by around 40 degree, with respect to the central light beam incident upon the 28$^{th}$ surface.

Values of the coefficients, indicative of the configurations of those two (2) free shaped surfaces, are shown in a Table 6 below.

between the two (2) free shaped surface mirrors (i.e., the first free shaped surface mirror 43 and the second free shaped surface mirror 44), but for compensating the trapezoidal distortion, preferably, it is desirable to determine the distance between those two (2) free shaped surface mirrors to be equal or greater than 150 mm. This is due to, if the two (2) free shaped surface mirrors come close too much, duplication is caused on the functions of the coefficients, being parameters of both, the capacity for compensating the distortion is restricted, and therefore, it is impossible to compensate the trapezoidal compensation, favorably.

Also, as an angle of view of the first optical system 42 mentioned above, it is preferable to determine the angle to be equal or less than 15 degree, being defined between the optical axis and the light beam, which emits from the upper end of the image screen of the image display element 41 and passes through an incidence pupil of the said first optical system. With this, it is possible to maintain the distance between the two (2) pieces of the free shaped surface mirrors, as well as, to maintain the sizes of the free shaped surface mirrors small.

Further, from the Tables 4 and 6, it can be seen that the curvature "c" and the conic coefficient "k" are zero (0), in the present embodiment 1. This is because the trapezoidal distortion caused due to the oblique incidence is generated, extremely in large, in particular, in the direction of the oblique incidence, but an amount of distortion is small in the vertical direction different therefrom. Accordingly, there are needed functions, being greatly different from each other, in the direction of the oblique incidence and the direction perpendicular thereto, and it is possible to compensate the figure distortion, preferably, without utilizing the curvature "c" and the conic coefficient "k" therein, which are rotationally symmetric and function in all directions.

TABLE 6

| Surface | | | Free Shaped Surface Coefficients | | | | | |
|---|---|---|---|---|---|---|---|---|
| S25 | | | C17 | 3.97589E−10 | C34 | −5.28699E−13 | C51 | 7.9672E−17 |
| | K | 0 | C19 | 1.38201E−09 | C36 | −2.88117E−15 | C53 | 1.26856E−16 |
| | C4 | −0.000069127 | C21 | 4.54608E−09 | C37 | 1.79988E−15 | C55 | 7.52318E−16 |
| | C6 | −0.0001909 | C22 | −6.4426E−12 | C39 | 2.49E−15 | C56 | −3.27811E−19 |
| | C8 | −9.2333E−06 | C24 | 1.51157E−11 | C41 | −8.82702E−15 | C58 | −1.40336E−18 |
| | C10 | −8.2751E−06 | C26 | 1.70954E−11 | C43 | −1.81468E−15 | C60 | 2.6418E−19 |
| | C11 | 5.35449E−08 | C28 | 1.51335E−12 | C45 | 1.44137E−14 | C62 | 2.53399E−18 |
| | C13 | −3.1103E−08 | C30 | 4.52321E−13 | C47 | −1.04893E−16 | C64 | 1.6311E−19 |
| | C15 | −1.6043E−08 | C32 | −6.12012E−14 | C49 | −5.79322E−17 | C66 | 7.9022E−18 |
| S26 | | | C17 | 4.6176E−10 | C34 | 7.67414E−15 | C51 | 4.78267E−19 |
| | K | 0 | C19 | −2.516E−10 | C36 | −4.95185E−16 | C53 | 1.7748E−19 |
| | C4 | −0.00152375 | C21 | −1.26156E−11 | C37 | 1.17737E−17 | C55 | −1.35846E−18 |
| | C6 | −0.000023622 | C22 | −5.60687E−13 | C39 | −1.8562E−16 | C56 | −2.07357E−22 |
| | C8 | −1.3215E−05 | C24 | 5.9598E−12 | C41 | 1.10968E−16 | C58 | 3.30436E−22 |
| | C10 | −4.8572E−06 | C26 | 7.73069E−13 | C43 | 3.95986E−17 | C60 | −5.48769E−21 |
| | C11 | 2.5034E−08 | C28 | 1.30848E−12 | C45 | −1.71225E−16 | C62 | 3.14467E−21 |
| | C13 | −8.124E−08 | C30 | −9.81285E−15 | C47 | 1.59137E−20 | C64 | 3.02674E−22 |
| | C15 | −3.1293E−08 | C32 | 3.92768E−14 | C49 | −1.61716E−18 | C66 | −3.14013E−21 |

As was mentioned above, in the present embodiment 2, though the distance is determined to be around 180 mm, Also, further in the optical system of the embodiment 2 mentioned above, the free shaped surface mirror on the surface S25 and the free shaped surface mirror on the surface S26 are disposed almost in parallel with, in particular, the axes of the local coordinates thereof, and with this, it is possible to compensate a spot configuration, as well as, the picture distortion, preferably.

Figure 9:
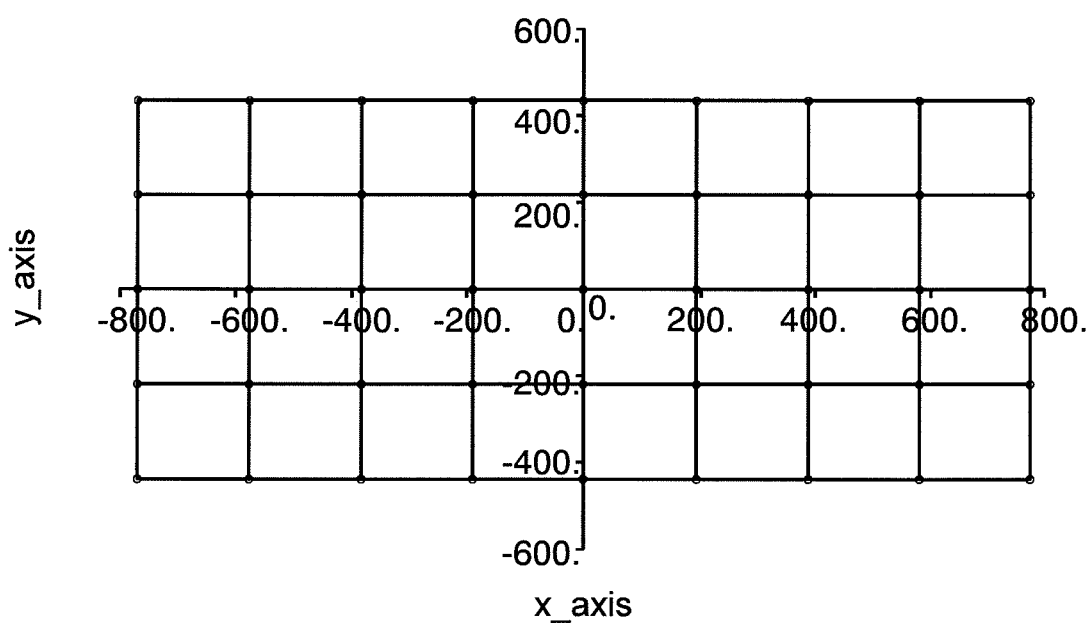
FIG. 9 is a view for showing distortion property within the projection optical unit, according the embodiment 2 of the present invention.
Figure 10:
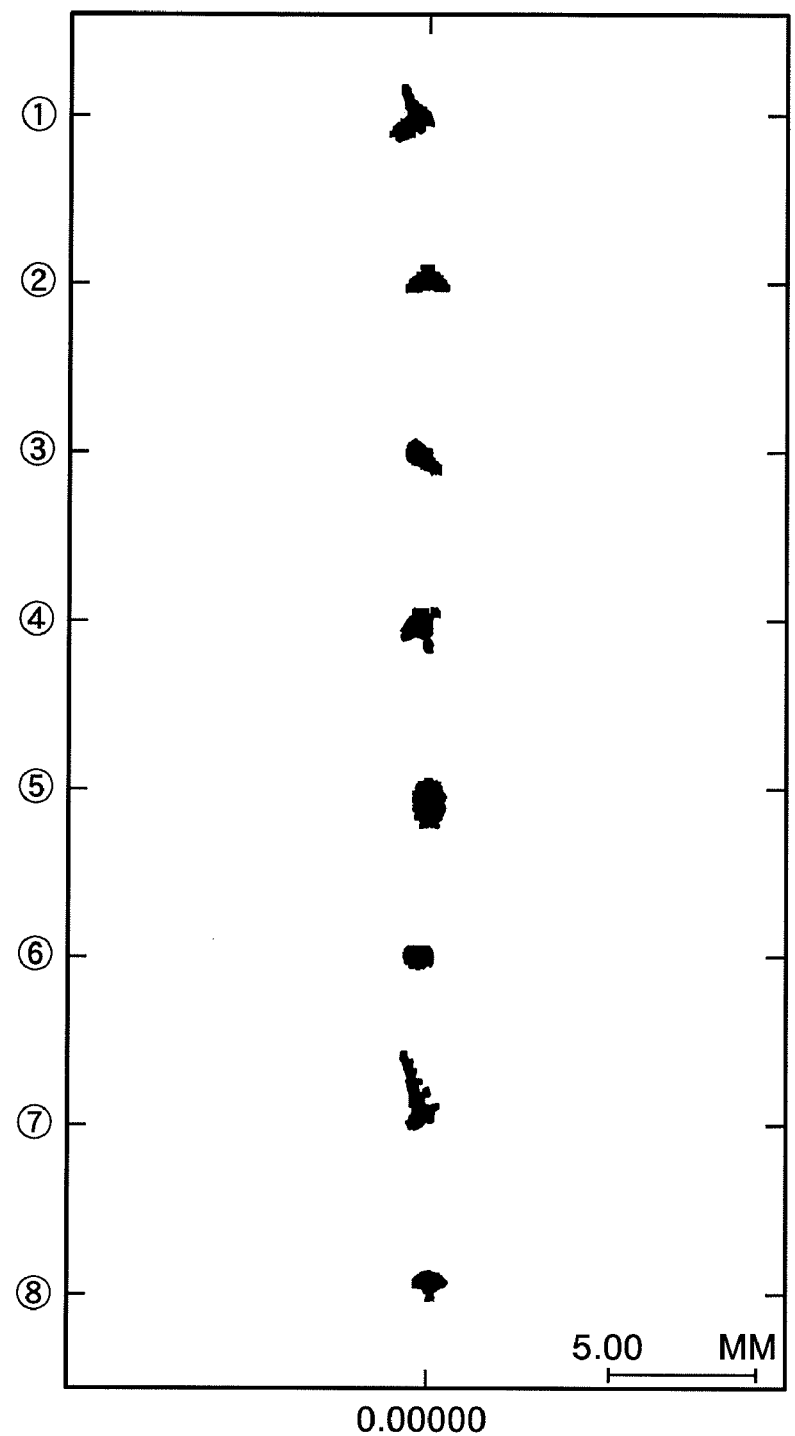
FIG. 10 is a view for showing spot property within the projection optical unit, according the embodiment 2 of the present invention.

Condition of the picture distortion will be shown in FIG. 9 attached, obtained from the optical system according to the present embodiment 2 mentioned above. However, the vertical direction (i.e., the y-axis) in FIG. 9 corresponds to the vertical (up-down) direction in FIG. 8 mentioned above, and the horizontal direction thereof (i.e., the x-axis) shows the direction perpendicular to the y-axis on the screen; i.e., the depth direction in FIG. 8. Also, a center of an oblong shown in this figure shows the center of the projection image screen or plane. And, in this figure is also shown the condition of compensation upon the picture distortion, which is obtained by means of the free shaped surface mirrors (i.e., the mirror of S25 and the mirror 34 of S26), through showing winding conditions of straight lines, which divide the projection image screen into four (4) in the vertical direction and eight (8) in the horizontal direction.

Further, a spot diagram obtained from the optical unit of the present embodiment 2 mentioned above will be shown in FIG. 10 attached. In this FIG. 10, there are shown the configurations of spot diagrams, which are indicated by numerals from (1) to (8), from above. Thus, the spot diagrams of light beams emitting or exiting from eight (8) points on the surface of the image display element 41 are shown, sequentially; in more details, (1, 1), (0, 1), (0.6, 0.6), (1, 0), (0.6, −0.6), (1, −1) and (0, −1) in the relative values on that xy coordinates, from above in the figure. Also, the horizontal direction on each of the spot diagrams shows the x-direction on the screen, and the vertical direction thereof the y-direction on the screen.

As was mentioned above, according to the present embodiment, it is possible to achieve a rear-surface projection color image display apparatus enabling to make the depth size of the apparatus very small, and further being easily producible. Though explanation was made only the image display apparatus of the rear-surface projection type in the above, however the present embodiment should not be limited only to that of such the rear-surface projection type. For example, if removing the rear-surface mirror in the optical system (or unit) mentioned above, thereby to obtain the structure of receiving therein those from the image display element to the free shaped surface mirrors into an inside of one apparatus, it is possible to obtain the image display apparatus, but of a front-surface projection type. Therefore, it is possible to achieve the image display apparatus of the front-surface projection type, being very short in the distance from the apparatus to the screen, i.e., in compact, and further having small trapezoidal distortion due to the oblique incidence.

Herein, a summary will be made about the projection optical units to be applied into the projection type image display apparatuses, on which various explanations are given in the above. First, in the present embodiment, the feature lies in the structure of the projection optical unit, for projecting an image displayed on the image display apparatus onto the screen, enlargedly. The present projection optical unit has a first optical system, including plural numbers of refraction lenses therein, each having a surface configuration of being rotationally symmetric, a second optical system including one (1) piece or plural pieces of reflection surface(s), disposed within a route of projecting the light beams emitted from the said first optical system onto a screen, each of which has a free shaped surface configuration, and one (1) piece of a reflection surface. The said image display element is so disposed that a center of the image display screen thereof is on an optical axis of the said first optical system. And, according to the present embodiments, it is characterized in that, on the vertical cross-section in parallel with the normal line on the screen, the said reflection mirror is made into such the free shaped surface configuration; i.e., if assuming that the light path length of the light beam 12 is "L1", being incident upon (or, entering to) the upper end of the screen, as shown in FIG. 1, and that the light path length of the light beam 13 is "L2", being incident upon (or, entering to) the lower end of the screen, an absolute value |L1−L2| of the difference between "L1" and "L2" comes to be smaller than that when making the reflection mirror of the said second optical system into a plane, the light path length.

Also, the configuration of reflection surface on the free shaped surface is made as follows, for example. Thus, a portion of the reflection mirror, for reflecting the light beam (for example, the light beam 12 in FIG. 1), which has a first optical distance, is curved to direct the concave into the reflection direction, i.e., to have a positive power thereon. Also, a portion of the reflection mirror, for reflecting the light beam (for example, the light beam 13 in FIG. 1), which has a second optical distance shorter than the first optical distance, is curved to direct the convex into the reflection direction, i.e., to have a negative power thereon.

Further, according to the present embodiments, there is provided the projection optical unit, wherein "L1" and "L2" mentioned above, the distance "Dv" from the upper end to the lower end on the image plane on the screen, and the angle "θ", which is defined between the light beam incident upon (or, entering into), at the center of the said screen image plane, and the normal line on said screen, can satisfy the following equation 6:

$$|L1-L2|<1.2\cdot\sin\theta\cdot Dv \quad \text{(Eg. 6)}$$

Also, in the projection optical unit mentioned above, there is provided one, wherein the optical path lengths "L1" and "L2", and the distance "Dv" from the upper end to the lower end on the image plane on the screen, can satisfy the following equation 7:

$$|L1-L2|>0.4\cdot Dv \quad \text{(Eg. 7)}$$

With this, it is possible to achieve the projection apparatus enabling to reduce the reflection surface having the free shaped surface configuration mentioned above, fully, in the effective sized thereof, thereby being easily producible.

Further, with the projection optical unit according to the present embodiment, the second optical system is build up with two (2) pieces of the free shaped surface mirrors. And, the distance is determined to be equal or greater than 150 mm, between those free shaped surface mirrors, along the light beam passing from the center of the image plane of the image display element through the center of the incidence pupil of the first optical system. With this, it is possible to compensate the trapezoidal distortion within the oblique projection, preferably.

Furthermore, within the projection optical unit according to the present embodiment, the angle is determined to be equal or less than 15 degree, being defined between the optical axis and the light beam, which emits from the upper end of the image plane on the image display element and passes through the center of entrance pupil of the first optical system. With this, it is possible to reduce the size of the reflection surface of free shaped surface to be small, and achieve the projection apparatus easily producible. Moreover, within the projection optical unit according to the present embodiment, the configuration of the reflection surface having the said free shaped surface can be expressed by only a multinomial with respect to the X and Y coordinate axes, but without using the coefficients for generating the configuration rotationally symmetric. Also, within the projection optical unit according to the present embodiment, the second optical system is built up with two (2) pieces of the free shaped surface mirrors. And, the respective coordinate axes of the local coordinate systems for those two (2) pieces surfaces are disposed to be nearly in parallel with each other.

With such the structure as was mentioned above, of the present embodiments, it is possible to shorten the depth of the apparatus, while obtaining or keeping a preferable picture quality, reducing the picture distortion on the screen, in the oblique projection.

The present invention may be embodied in other specific forms without departing from the spirit or essential feature or characteristics thereof. The present embodiment(s) is/are therefore to be considered in all respects as illustrative and not restrictive, the scope of the invention being indicated by the appended claims rather than by the forgoing description and range of equivalency of the claims are therefore to be embraces therein.

What is claimed is:

1. A projection-type image display apparatus, comprising:
    a first optical system, including an image display element, a screen, and plural numbers of lenses, for projecting a display image on said image display element, enlargedly; and
    a second optical system for projecting an enlarged image from said first optical system, at a predetermined angle to a normal line on said screen;
    wherein said second optical system includes an optical element therein, having a curved surface for reflecting the enlarged image from said first optical system, so as to guide onto said screen, and
    a portion of said optical element, for reflecting a light at a first optical distance, is curved to direct a concave into a reflection direction thereon, while a portion of said optical element, for reflecting a light at a second optical distance shorter than said first optical distance, is curved to direct a convex into a reflection direction thereon, if assuming that an optical path length of the light incident upon said screen is the optical distances.

2. The projection-type image display apparatus, as is described in the claim 1, wherein said optical element is a curved surface reflection mirror, a reflection surface of which is formed into a free shaped surface configuration, and said second optical system makes projection from a portion lower than said screen at a predetermined angle with respect to the normal line on said screen, and
    said curved surface reflection mirror is so curved, as to direct a concave into the reflection direction thereon in a portion thereof, for reflecting the light of an upper image above a center on said image display element, and to direct a convex into the reflection direction thereon in a portion thereof, for reflecting the light of a lower image below the center on said image display element.

3. The projection-type image display apparatus, as is described in the claim 1, further comprising a plane-like rear-surface mirror for reflecting the enlarged image from said optical element, thereby to project it on a rear-surface side of said screen.

4. The projection-type image display apparatus, as is described in the claim 3, wherein said optical element is disposed below said rear-surface mirror.

5. The projection-type image display apparatus, as is described in the claim 4, wherein said optical element includes at least two (2) pieces of mirrors, each reflection surface of which is formed into the free shaped surface configuration.

6. A projection-type image display apparatus, comprising:
    an image display element;
    a screen;
    a first optical system, including plural numbers of lenses therein, for projecting a display image on said image display element, enlargedly, and being a coaxial optical system, which is constructed with surfaces, an optical axis of each of which passes through at almost a center of said image display element and each having a symmetric configuration with respect to said optical axis; and
    a second optical system for projecting an enlarged image from said first optical system onto said screen, obliquely, being inclined thereto;
    wherein said second optical system includes an optical element having a free shaped surface, for compensating a trapezoidal distortion and/or an aberration, wherein said optical element includes a curved surface reflection mirror, and within said curved surface reflection mirror, a portion for reflecting the light of an upper image above a center on said image display element is curved to direct a concave into the reflection direction thereon, thereby having a positive power, and a portion for reflecting the light of an upper image below the center on said image display element is curved to direct a convex into the reflection direction thereon, thereby having a negative power.

7. A projection optical unit to be used in a projection image display apparatus, comprising:
    a first optical system including plural numbers of lenses therein, for projecting a display image on an image display element, enlargedly, having an optical axis thereof being nearly equal to a central axis of said image display element; and
    a second optical system for projecting an enlarged image from said first optical system onto a screen, at a predetermined angle with respect to a normal line on said screen;
    wherein said second optical system includes an optical element having a reflection surface of forming a free shaped surface configuration, for reflecting the enlarged image from said first optical system, thereby to guide it onto said screen, and
    a portion of said optical element, for reflecting an image on said image display element above a center thereof, is curved to direct a concave into a reflection direction thereon, while a portion thereof said optical element, for reflecting the image on said image display element below the center thereof, is curved to direct a convex into a reflection direction thereon.

8. The projection optical unit, as described in the claim 7, wherein said optical element is a curved surface reflection mirror having a free shaped surface configuration.

9. The projection optical unit, as described in the claim 8, wherein said optical element includes at least two (2) pieces of said curved surface reflection mirrors.

10. The projection optical unit, as described in the claim 7, wherein if assuming that a distance for a light beam of an upper end of said enlarged image to reach said screen after being reflected upon said reflection surface is "L1", the a distance for a light beam of a lower end of said enlarged image to reach said screen after being reflected upon said reflection surface is "L2", a distance from an upper end of an image on said screen to a lower end thereof is "Dv", and an angle defined by a light beam incident upon on said screen at a center thereof and a normal line on said screen is ".theta.", within a surface in a direction perpendicular to said screen, being in parallel with the normal line on said screen, then they are so constructed as to satisfy a following equation:

$$|L1-L2|<1.2 \times \sin \theta \times Dv.$$

11. The projection optical unit, as described in the claim 7, wherein if assuming that a distance for a light beam of an upper end of said enlarged image to reach said screen after being reflected upon said reflection surface is "L1", the a distance for a light beam of a lower end of said enlarged image to reach said screen after being reflected upon said reflection surface is "L2", and a distance from an upper end of an image on said screen to a lower end thereof is "Dv", within a surface in a direction perpendicular to said screen, being in parallel with the normal line on said screen, then those are so constructed as to satisfy a following equation:

$$|L1-L2|>1.4 \times Dv.$$

12. The projection optical unit, as described in the claim 7, wherein a portion of said optical element for reflecting the image above a center of said image display element has a positive power, and a portion thereof for reflecting the image below the center of said image display element has a negative power.

13. The projection-type image display apparatus, as is described in the claim 6, wherein the free shaped surface of said optical element includes at least one (1) pieces of a mirror surface.

* * * * *